(12) United States Patent
Oami

(10) Patent No.: US 6,697,499 B2
(45) Date of Patent: Feb. 24, 2004

(54) DIGITAL WATERMARK INSERTING SYSTEM AND DIGITAL WATERMARK CHARACTERISTIC PARAMETER TABLE GENERATING METHOD

(75) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/392,580

(22) Filed: Mar. 20, 2003

(65) Prior Publication Data

US 2003/0161498 A1 Aug. 28, 2003

Related U.S. Application Data

(62) Division of application No. 09/480,023, filed on Jan. 10, 2000.

(30) Foreign Application Priority Data

Jan. 13, 1999 (JP) .......................................... 11-007038

(51) Int. Cl.⁷ ............................................... G06K 9/00
(52) U.S. Cl. ...................................................... 382/100
(58) Field of Search ........................................ 382/100

(56) References Cited

U.S. PATENT DOCUMENTS

| 5,930,369 | A | 7/1999 | Cox et al. | |
|---|---|---|---|---|
| 6,154,571 | A | 11/2000 | Cox et al. | |
| 6,181,802 | B1 | 1/2001 | Todd | |
| 6,205,249 | B1 | * 3/2001 | Moskowitz | 382/232 |
| 6,222,932 | B1 | 4/2001 | Rao et al. | |
| 6,343,138 | B1 | 1/2002 | Rhoads | |
| 6,415,041 | B1 | 7/2002 | Oami et al. | |
| 6,470,090 | B2 | 10/2002 | Oami et al. | |

FOREIGN PATENT DOCUMENTS

| JP | 7-028986 | 1/1995 |
|---|---|---|
| JP | 08-018986 | 1/1995 |
| JP | 10-191330 | 7/1998 |
| JP | 10-224342 | 8/1998 |
| JP | 10-303755 | 11/1998 |

OTHER PUBLICATIONS

"Building of a sensitivity appraisal scale pertaining to the attack of electronic watermarks", Information Processing Society 57th (second half year 1998) National Assembly 5G–6, p. 3–498–3–499.

"Electronic watermark techniques and the items for appraisal thereof", Electronic Images Society Journal, vol. 27, No. 5, p. 483–491, 1998.

(List continued on next page.)

*Primary Examiner*—Leo Boudreau
*Assistant Examiner*—Hussein Akhavannik
(74) *Attorney, Agent, or Firm*—Scully, Scott, Murphy & Presser

(57) ABSTRACT

A digital watermark inserting system for inserting digital watermark information into an input image is disclosed, that comprises a categorizing portion 103 for calculating a feature amount of the input image, categorizing the input image to a category index, a digital watermark characteristic calculating portion 104 for calculating an image deteriorating ratio and a robustness evaluation value corresponding to a digital watermark strength based on a robustness evaluation value calculation parameter and the category index, a digital watermark strength calculating portion 100 for outputting the digital watermark strength to the portion 104, deciding the optimum digital watermark strength based on digital watermark strength restriction information, and outputting the optimum digital watermark strength, and a digital watermark inserting portion 102 for converting input embedding data into digital watermark information, inserting the digital watermark information into the input image.

2 Claims, 27 Drawing Sheets

OTHER PUBLICATIONS

"Attacks on Copyright Marking System [sic]", second workshop on Information Hiding, vol 1525 of Lecutre [sic] Notes in Computer Science, Portland, Oregon, USA, Apr. 14–17, 1998, pp218–238.

"Analysis of the Sensitivity Attack against Electronic Watermarks in Images", David Aucsmith, Ed., Second Workshop on Information Hiding, Lecture Notes in Computer Science, Portland, Oregon, USA, Apr. 14–17, 1998.

"Secure spread Spectrum Watermarking for Multimedia", IEEE Transactions on Image Processing, vol. 6, No. 12, Dec. 1997.

* cited by examiner

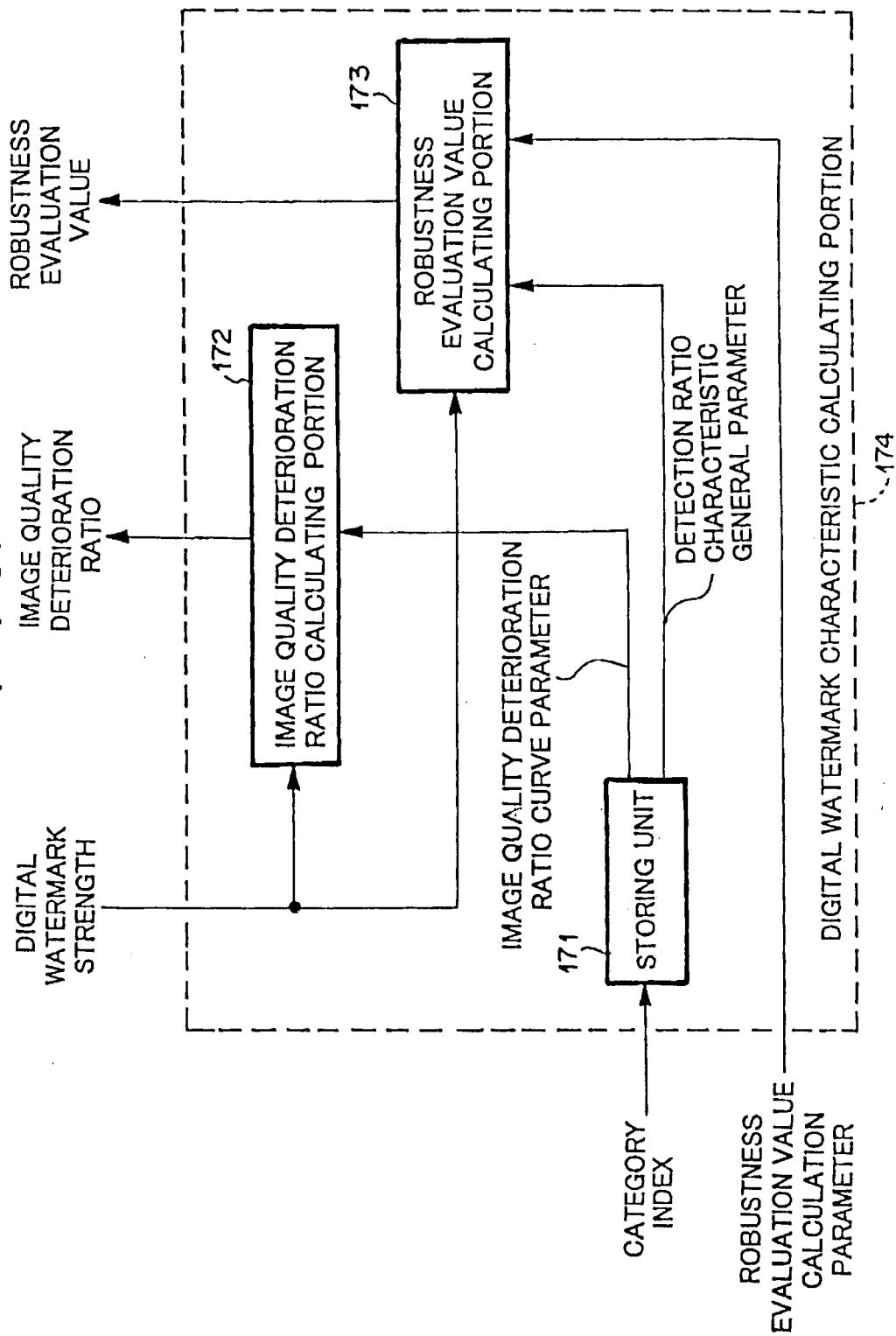

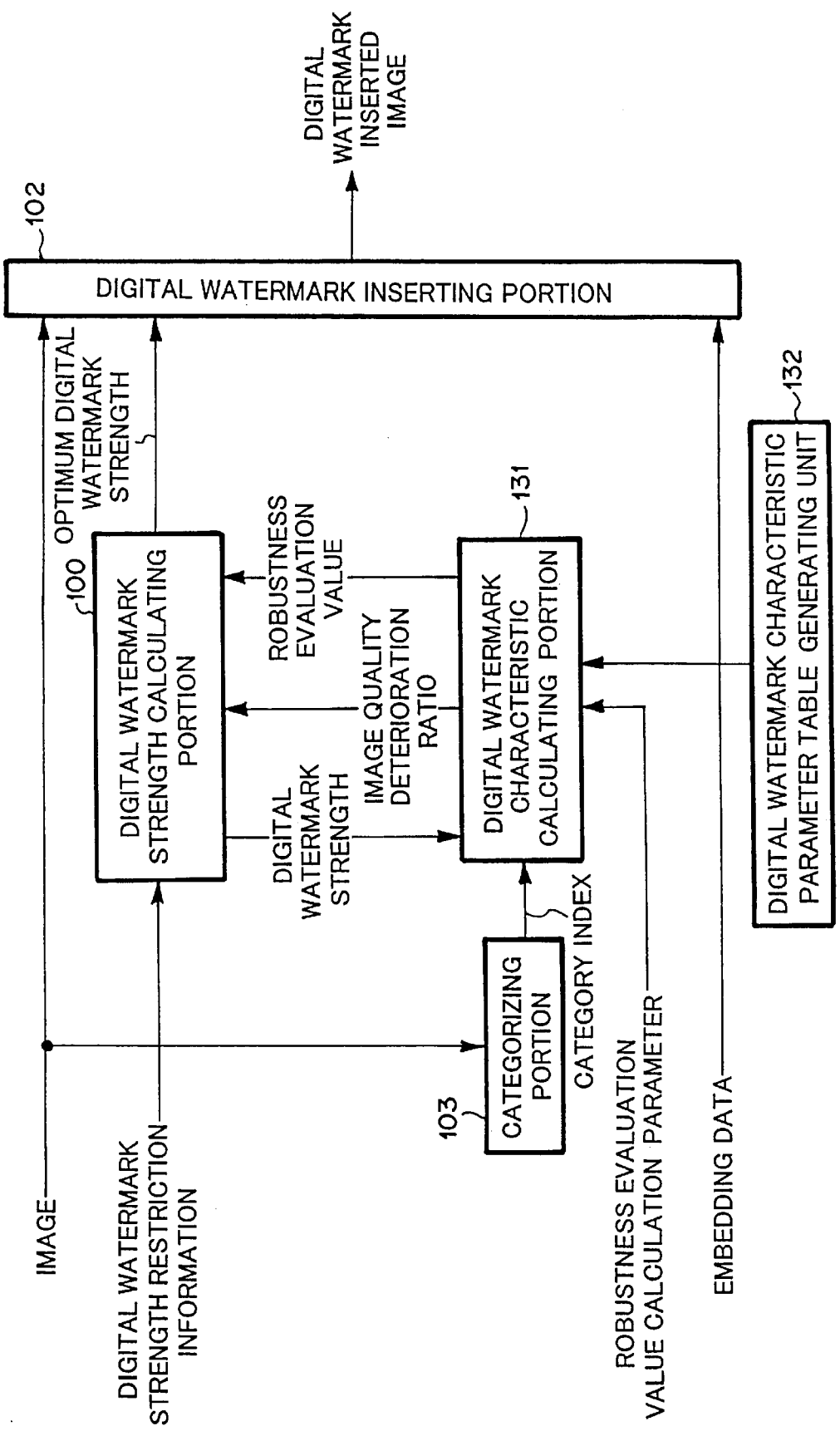

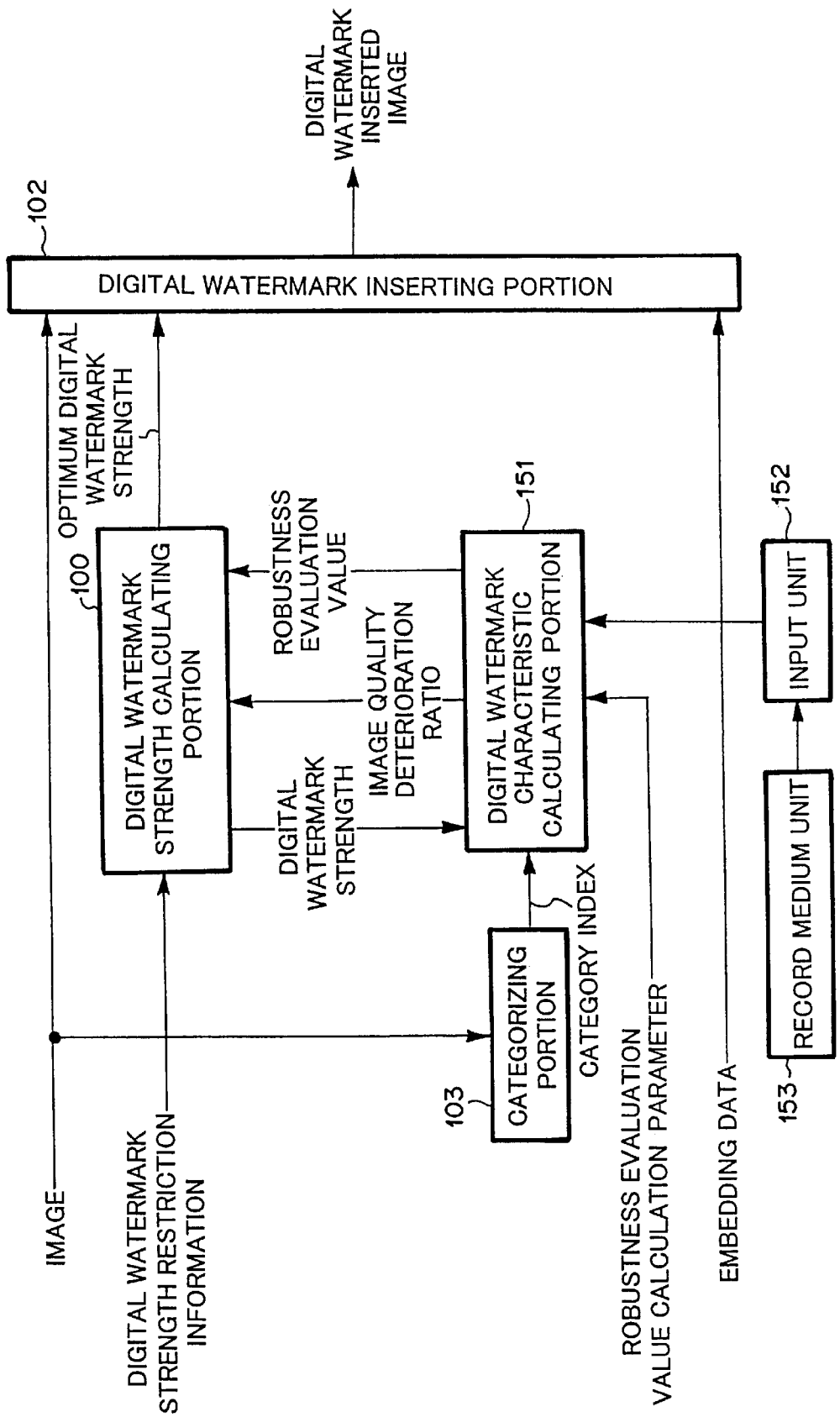

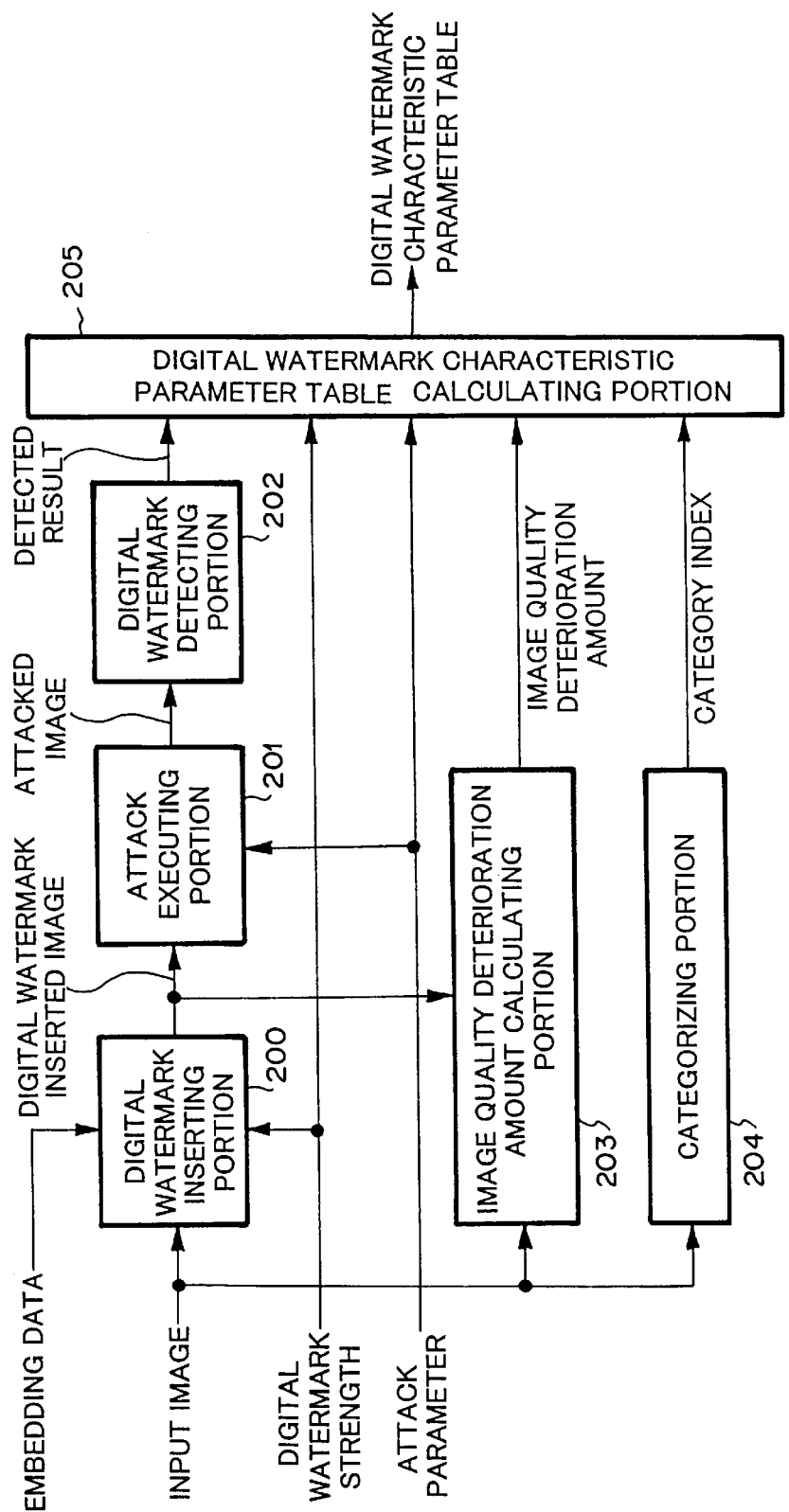

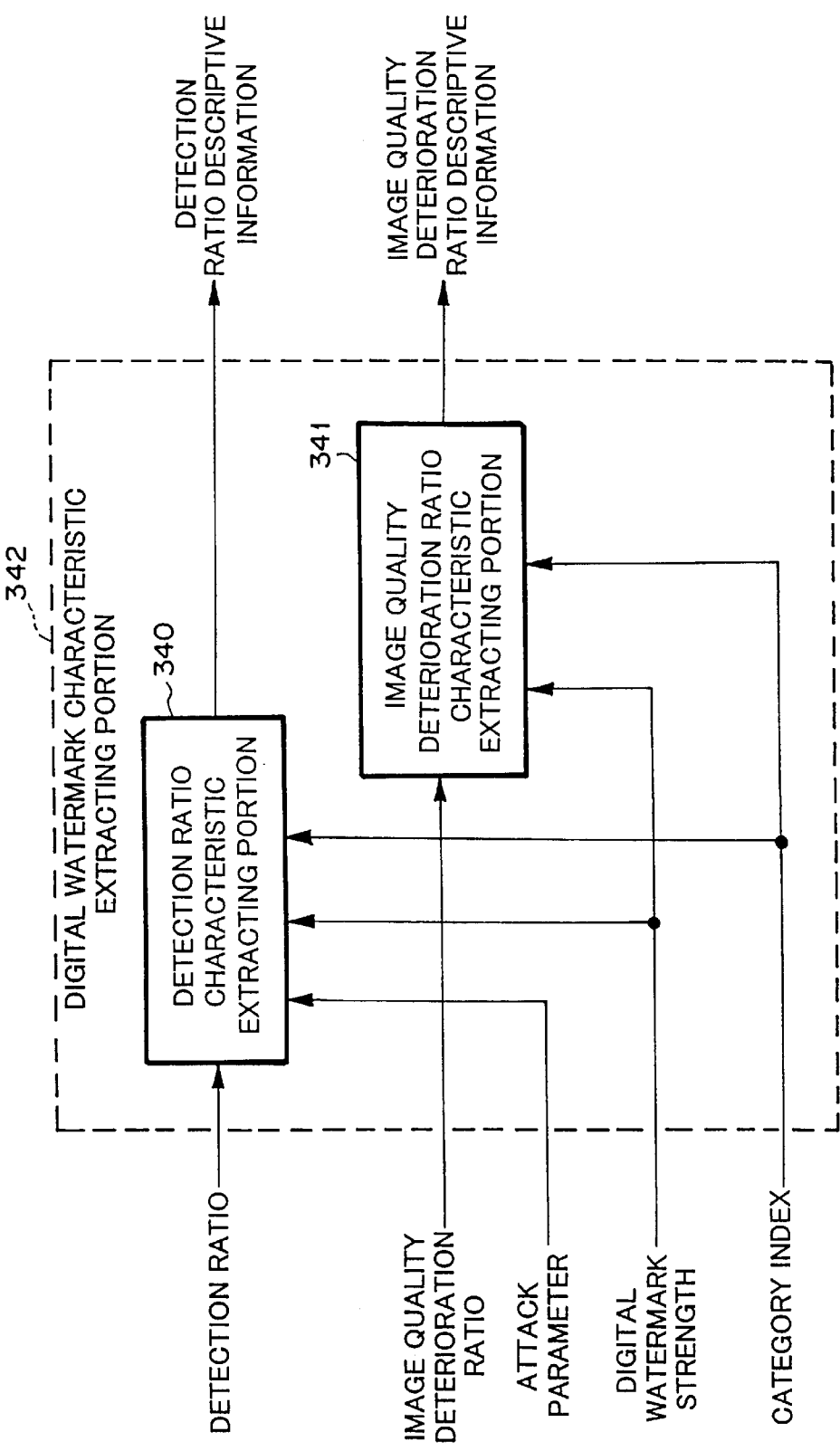

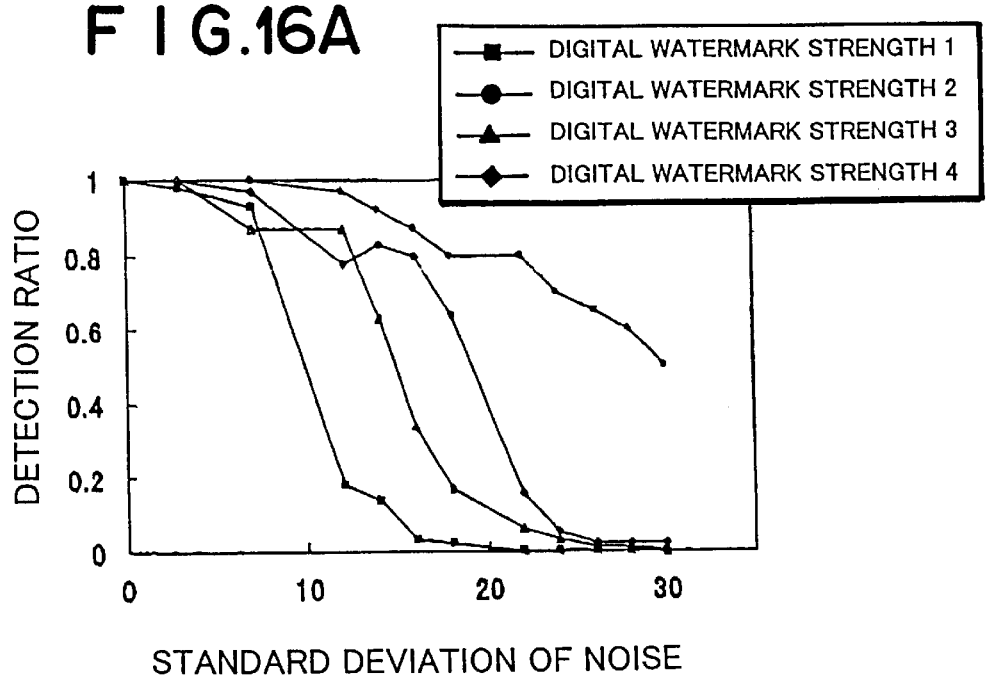
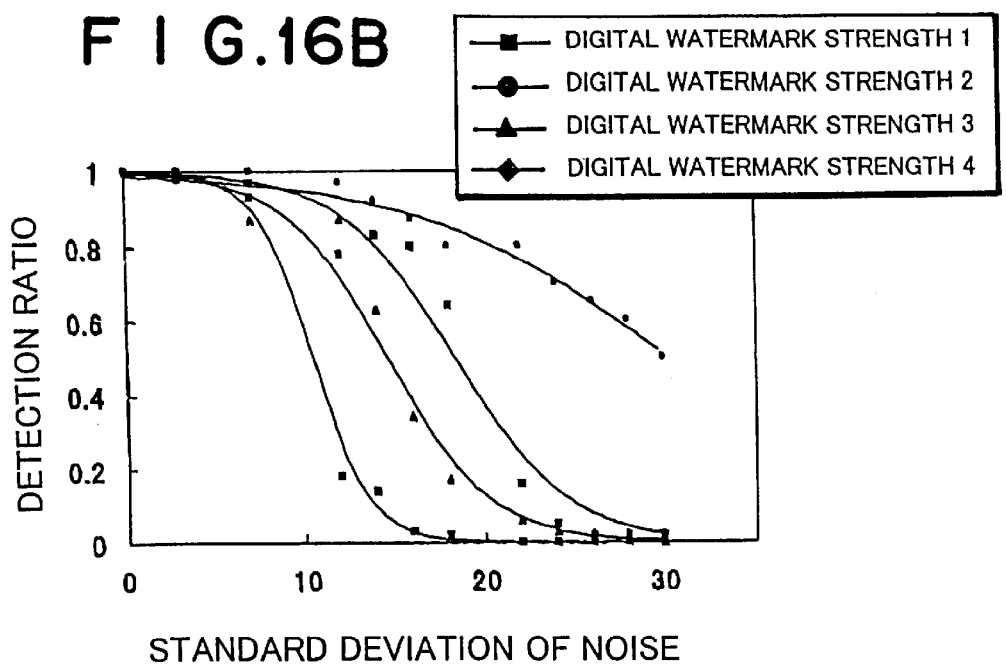

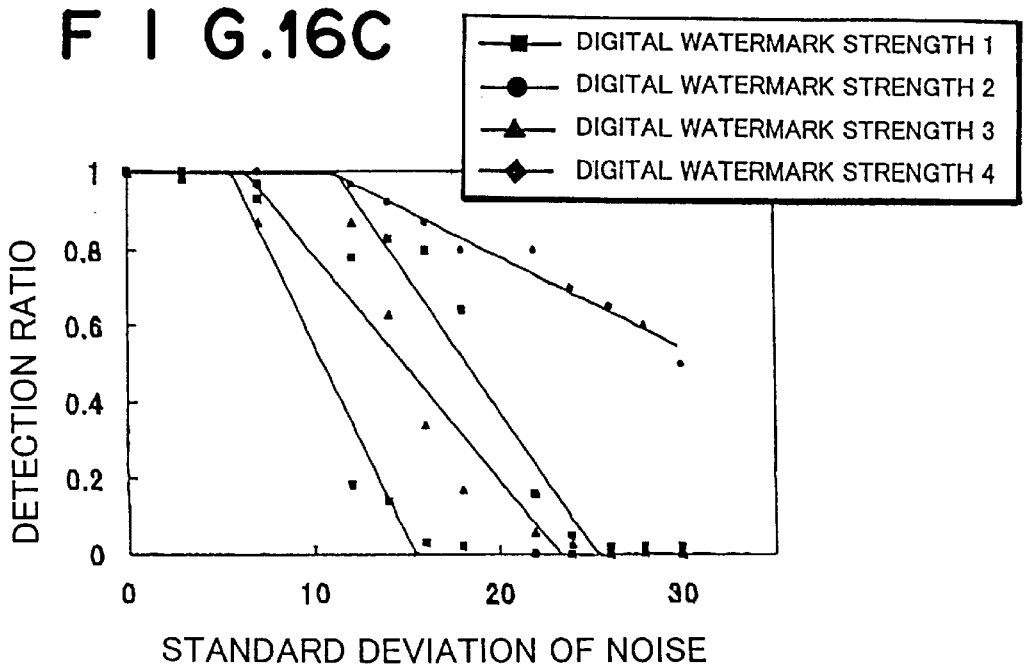
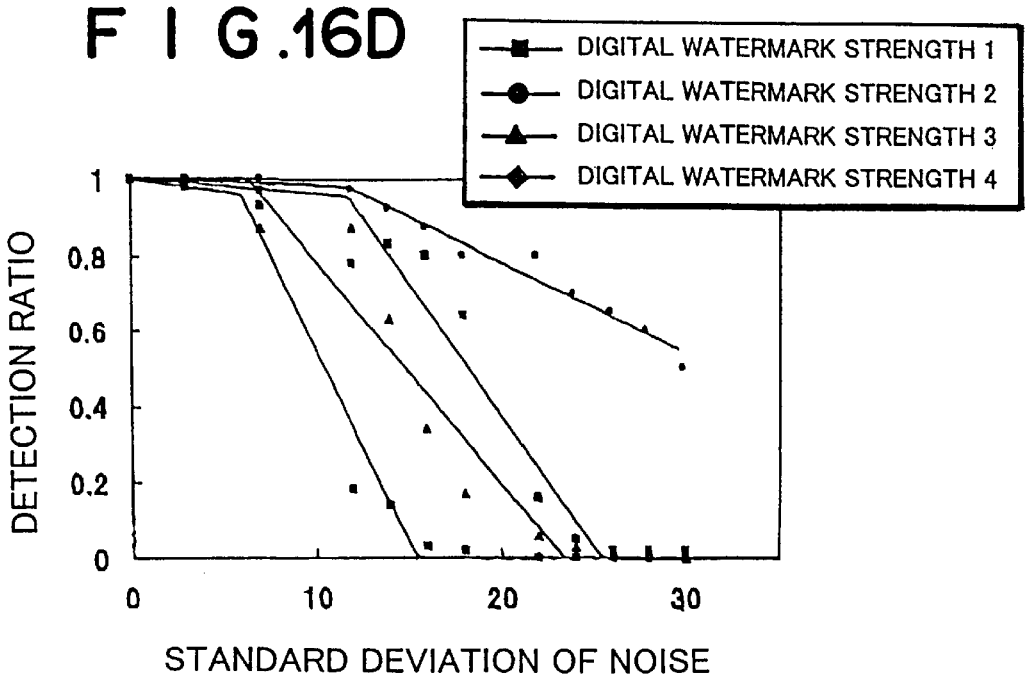

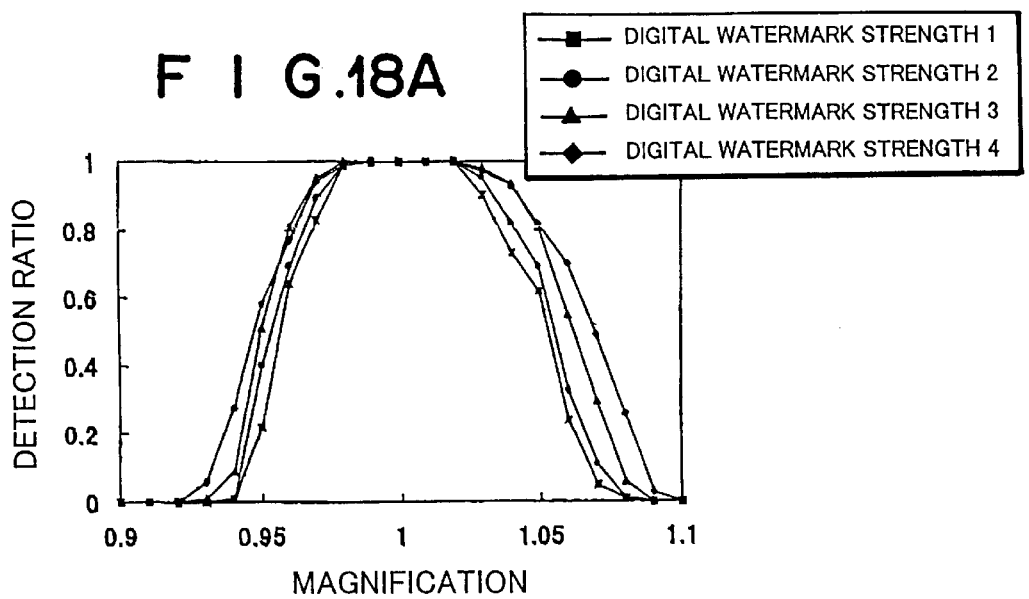
F I G. 18A
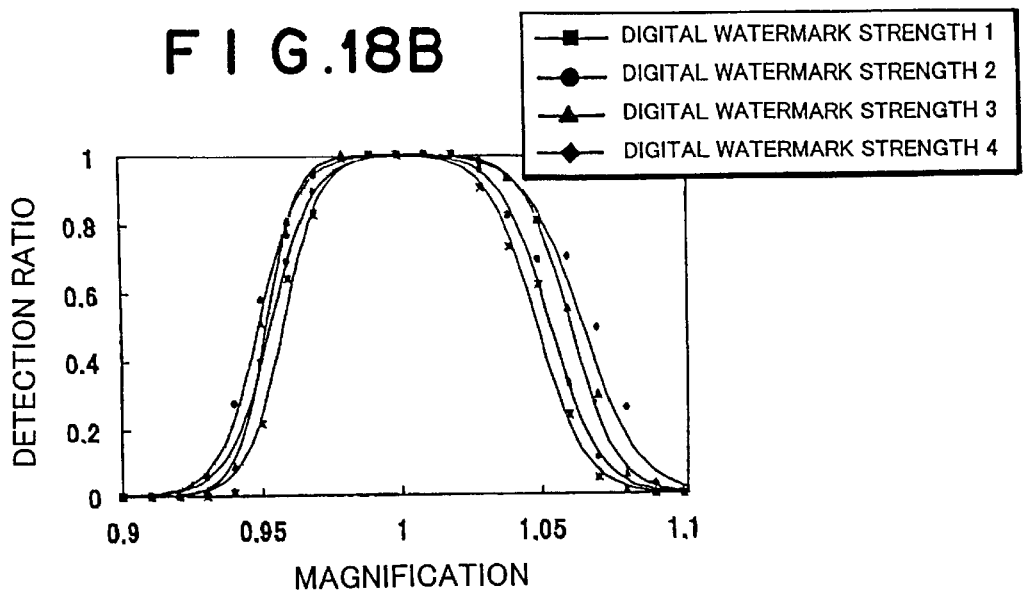
F I G. 18B

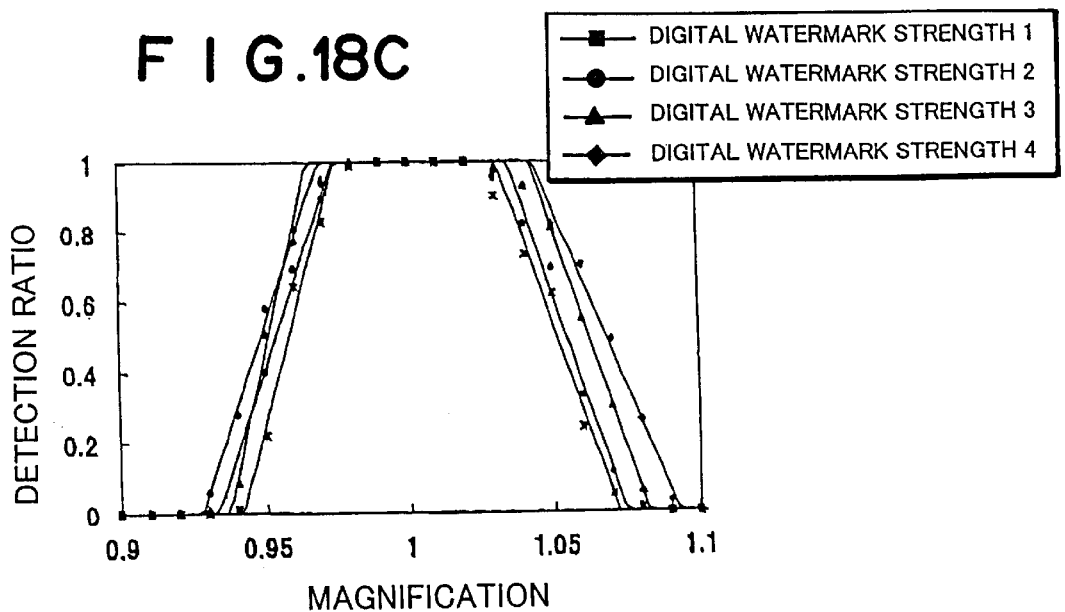
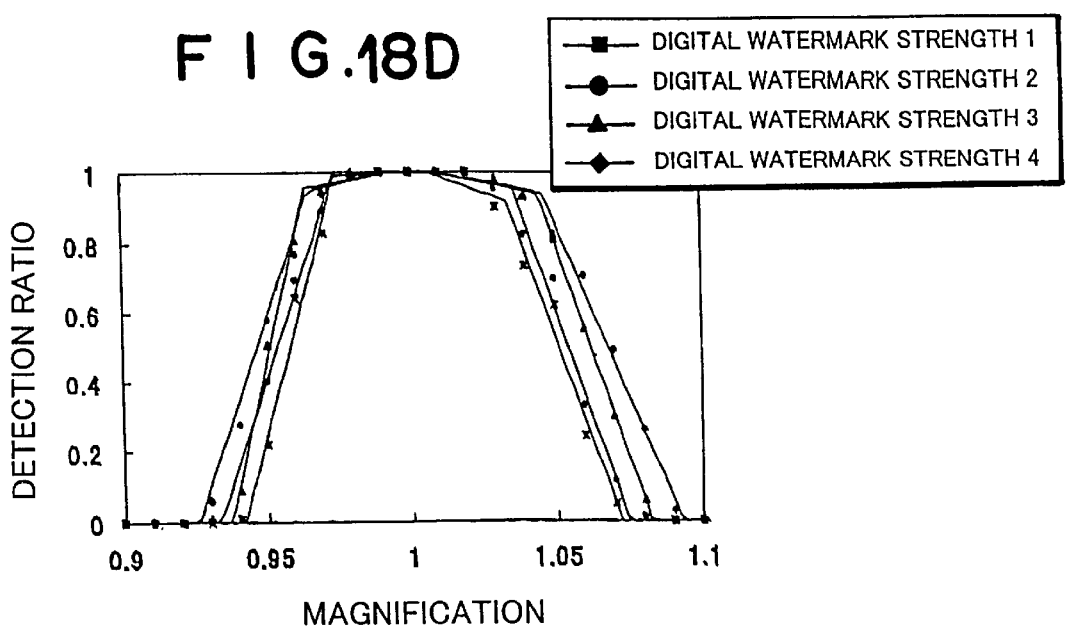

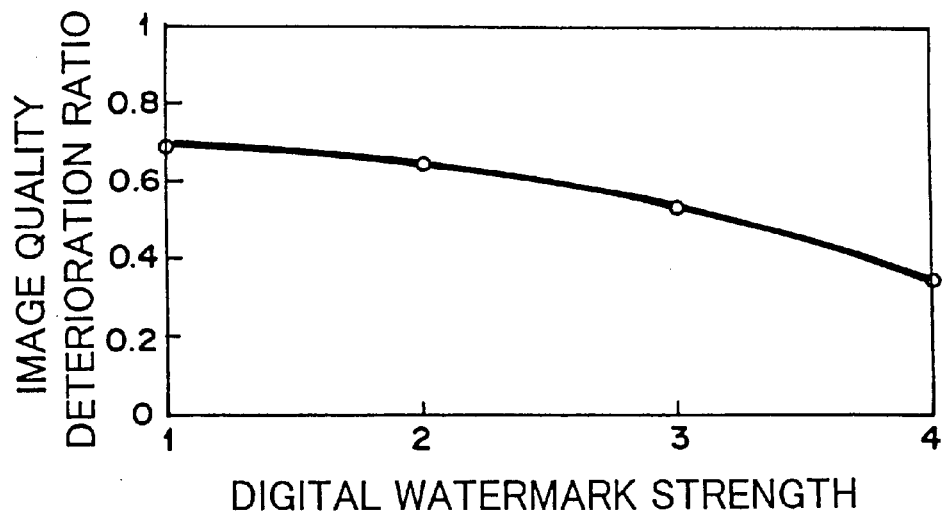
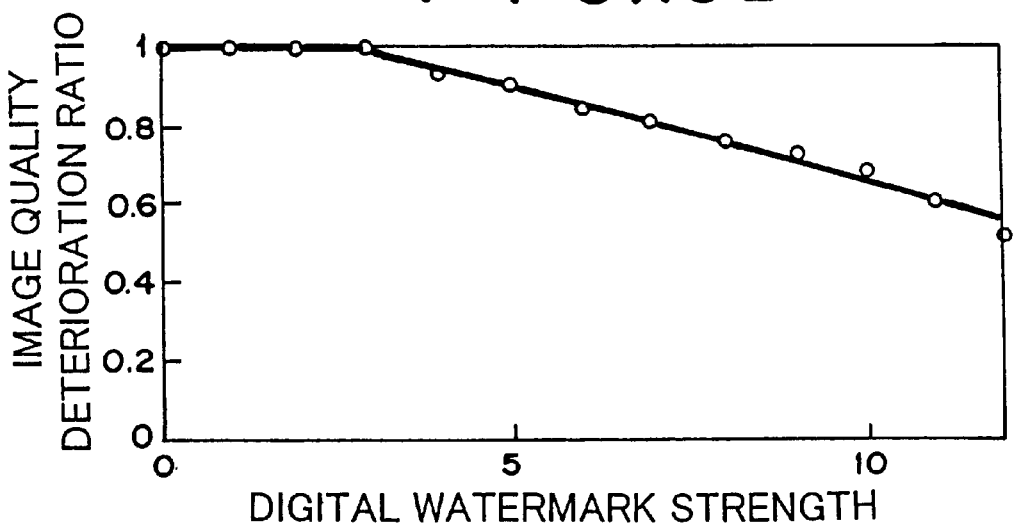

F I G. 24A
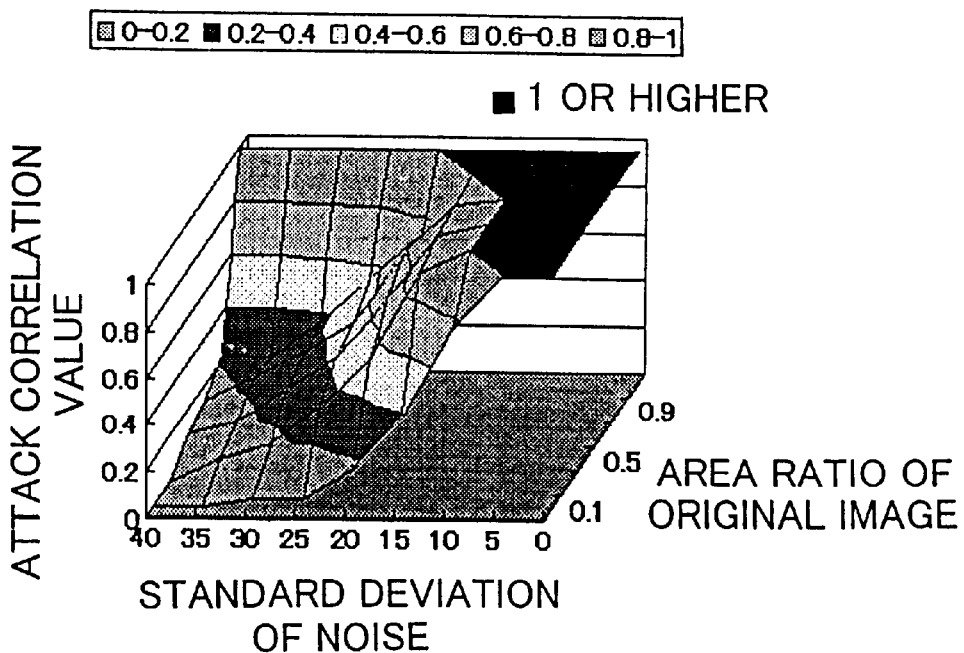
F I G. 24B
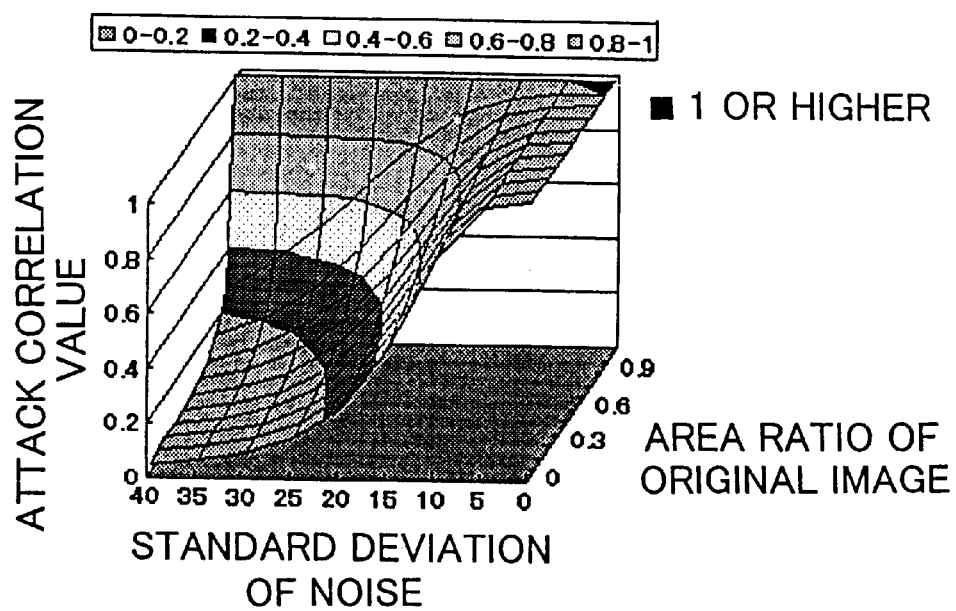

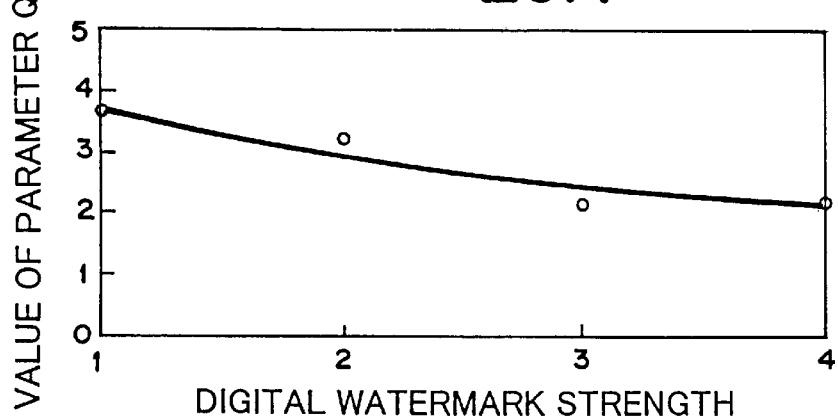
F I G. 25A
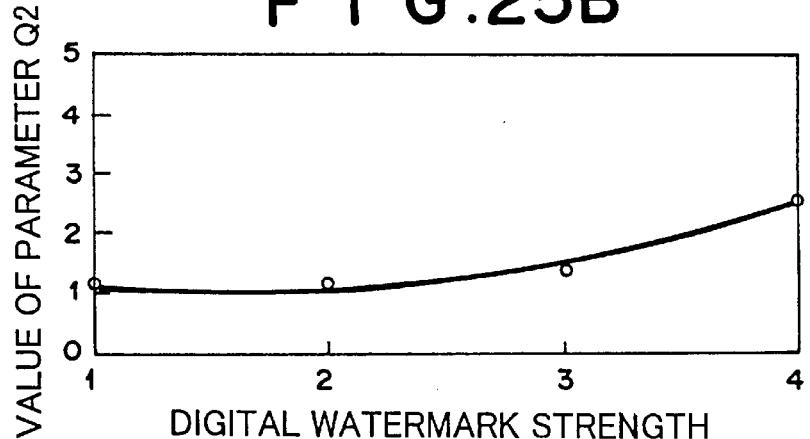
F I G. 25B
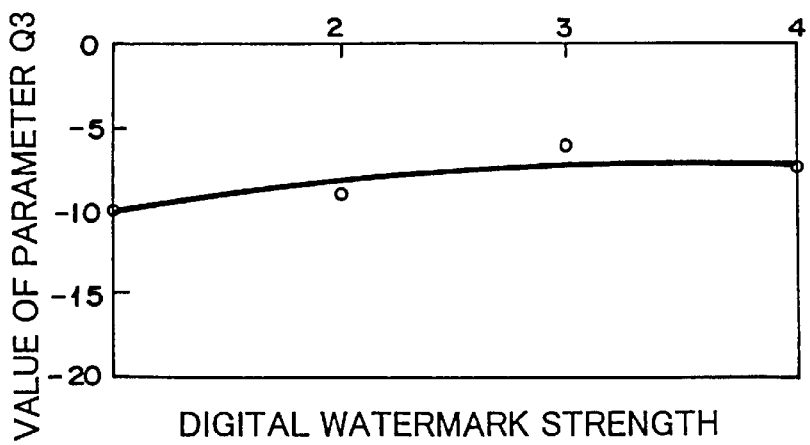
F I G. 25C

DIGITAL WATERMARK INSERTING SYSTEM AND DIGITAL WATERMARK CHARACTERISTIC PARAMETER TABLE GENERATING METHOD

CROSS REFERENCE TO RELATED APPLICATION

The present application is a divisional of copending application Ser. No. 09/480,023 filed on Jan. 10, 2000.

BACKGROUND OF THE INVENTION

1. Field of the Invention

The present invention relates toga digital watermark inserting system for inserting digital watermark information into an input image, a digital watermark characteristic parameter table generating method, and a computer readable record medium on which a digital watermark characteristic parameter table generating program has been recorded.

2. Description of the Related Art

In recent years, digital watermarks are becoming attractive. However, there have been few studies that focus on attacks against digital watermarks. As a result, it is difficult to compare robustness values against attacks in different digital watermark systems. As a related art reference, a framework of a robustness evaluation value calculating system for categorizing attacks that take place in conventional image processing and so forth and calculating robustness evaluation values for individually categorized attacks has been disclosed by Ryoma Oami, Yoshihiro Miyamoto, and Mutsumi Ohta, NEC C & C Media Research Laboratories in "Robustness Measure against attacks for digital watermarking and its application," 1998 Image Media Processing Symposium (IMPS 98). The related art reference describes a method for obtaining the optimum digital watermark strength.

In the related art reference, attacks against digital watermarks are largely categorized as (1) deterioration that takes place in an image processing or the like and (2) intentional forgery of embedded information. Since attacks of the category (1) inevitably take place in a conventional image process. Thus, strong robustness is required for attacks of the category (1). Attacks of the category (2) are higher level attacks than those of the category (1). The attacks of the category (2) largely depend on the digital watermark inserting and detecting system. In the related art reference, attacks of the category (1) are further categorized from a view point of a signal processing. Robustness evaluation values are calculated for individually categorized attacks. The categorized attacks are for example coding loss in JPEG (LC), uniform and Gauss type noise (N), geometric transform such as scale and rotation (GT), pixel value conversion such as gray and binary (PVC), and image processing such as sharpening and median filtering (IP).

In the system of the related art reference, a digital watermark is inserted into an image. Thus, a digital watermark inserted image is obtained. Thereafter, the digital watermark inserted image is attacked in a predetermined manner and then the digital watermark is detected. By repeating the above procedures, varying a parameter for adjusting the attack strength, a detection ratio is obtained. The detection ratio data is statistically processed. Thus, robustness evaluation values for individually categorized attacks are calculated. As the statistical process, weighted means method or threshold value method is used, for example. In the evaluation value calculating system, (a) by properly setting a weighting function, evaluation values for applications having different attack characteristics can be calculated; (b) robustness evaluation values can be compared among different systems regardless of the values of the attack strength x for really measuring detection ratios; and (c) the accuracy of evaluation values can be improved progressively. According to the evaluation value calculating system, evaluation values 0 to 1 against watermark strength values 1 to 4 depend on conventional digital watermark systems.

However, according to the digital watermark inserting system of the related art reference, it is difficult to properly set the strength of a digital watermark. The strength of the digital watermark largely depends on the contents of the image. Even if the user designates the relation of the strength of digital watermarks, the deterioration of the image quality, and the robustness values against attacks in a deterministic manner, the relation cannot be applied to all images. Thus, the optimum strength of digital watermarks cannot be obtained.

The inventor of the present invention has invented "digital watermark inserting system" that is currently being filed as Japanese Patent Application No. 10-150823 (hereinafter, this invention may be referred to as second related art reference). This invention was made to embed (insert) copyright information and so forth into digital signals of audio data, image data, and so forth.

FIG. 1 is a block diagram showing the structure of the "digital watermark inserting system" as the second related art reference. In FIG. 1, a categorizing portion 103 calculates a feature amount of an input image, obtains a category of the image with the calculated feature amount, and outputs the index indicating the category as a category index to a storing unit 2001. The storing unit 2001 selects a table corresponding to the category index that is received from the categorizing portion 103 and outputs an image quality deterioration ratio and a robustness evaluation value corresponding to digital watermark strength that is received from a digital watermark strength calculating portion 100 to the digital watermark strength calculating portion 100.

The digital watermark strength calculating portion 100 outputs various digital watermark strength values to the storing unit 2001. The digital watermark strength calculating portion 100 decides the optimum digital watermark strength based on the image quality deterioration ratio and the robustness evaluation value that are received from the storing unit 2001 and based on restriction information of digital watermark strength that is input by the user and outputs the decided optimum digital watermark strength data to a digital watermark inserting portion 102.

The digital watermark inserting portion 102 converts embedding data into digital watermark information, inserts the digital watermark into the image with the optimum digital watermark strength received from the digital watermark strength calculating portion 100, and outputs a digital watermark inserted image.

Next, the operation of the digital watermark inserting system shown in FIG. 1 will be described. First of all, several symbols used in the operation will be defined.

The number of categories of input images is denoted by K. K categories are distinguished with category index k (where k=1, . . . , K). The digital watermark strength with which a digital watermark is inserted is denoted by s(m) (where m=1, . . . , M). The parameter used as the digital watermark strength depends on the digital watermark inserting algorithm for use. When the digital watermark strength is successively varied, it is digitized into M different values and their values are denoted by s(m). When the category index is k and the digital watermark strength is s(m), the image quality deterioration ratio and the robustness evaluation value against the attack are denoted by D(k,m) and V(k,m), respectively.

Next, with reference to FIG. 1, the operation of the digital watermark inserting system will be described. An input image is supplied to the categorizing portion 103. The categorizing portion 103 calculates a feature amount of the image, decides the category of the input image based on the obtained feature amount, and outputs a category index that represents the category. In reality, the categorizing portion 103 stores feature amount values that represent boundaries of categories. The categorizing portion 103 compares the stored feature amount values with the calculated feature amount value and categorizes the input image based on the compared result. The feature amount is for example an activity of the entire image (the activity is the mean value of AC frequency components).

The category index that is output from the categorizing portion 103 is input to the storing unit 2001. The storing unit 2001 stores digital watermark feature tables for individual category indexes. Each of the digital watermark feature tables represents the relation of the digital watermark strength values, the image quality deterioration ratios and the robustness evaluation values against attacks. A digital watermark characteristic table for a category index k is shown in Table 1.

TABLE 1

| Digital watermark strength | Image quality deterioration amount | Robustness evaluation values against attack |
|---|---|---|
| s(1) | D(k, 1) | V(k, 1) |
| s(2) | D(k, 2) | V(k, 2) |
| ... | ... | ... |
| s(M) | D(k, M) | V(k, M) |

In addition, when a digital watermark strength s(m) is input from the digital watermark strength calculating portion 100, the storing unit 2001 selects a digital watermark characteristic table corresponding to the category index k that is received from the categorizing portion 103, and outputs the image quality deterioration amount D(k, m) and the robustness evaluation value V(k, m) to the digital watermark strength calculating portion 100.

After the input image has been supplied to the system and the categorizing portion 103 has calculated the category index k, the digital watermark strength calculating portion 100 calculates the optimum digital watermark strength based on digital watermark strength restriction information that is input by the user. Basically, the digital watermark strength that maximizes the following objective function is defined as the optimum digital watermark strength.

$$Z(m) = (1-a)(1-D(k, m)) + aV(k, m). \quad (1)$$

where a satisfies the relation of $0 \leq a \leq 1$. Z(m) is calculated for each digital watermark strength value. The digital watermark strength s(m) with the maximum value is calculated as the optimum digital watermark strength.

The optimum digital watermark strength that is output from the digital watermark strength calculating portion 100 is input to the digital watermark inserting portion 102. The digital watermark inserting portion 102 converts the input embedding data into digital watermark information and inserts the input embedding data into the image. The digital watermark strength used in inserting the input embedding data into the image is the optimum digital watermark strength that is output from the digital watermark strength calculating portion 100. The resultant image is output as a digital watermark inserted image.

According to the second related art reference, the digital watermark inserting algorithm is not limited as long as the user can designate the digital watermark strength or the like for the digital watermark inserted into the image. For example, the watermarking algorithm disclosed in Japanese Patent Laid-Open Publication No. 9-191394 and periodical "IEEE Transactions on Image Processing," Vol. IP-6, pp. 1673–1687, No. 12, 1997 can be used.

In this algorithm, the entire image is processed by discrete cosine transform (DCT) method or discrete Fourier transform (DFT) method. The N largest transform coefficients are selected from the obtained transform coefficients. Thereafter, digital watermark information is inserted. In reality, digital watermark information is inserted corresponding to the following formula.

$$v' = v + \alpha x \quad (2)$$

or $$v' = v(1 + \alpha x) \quad (3)$$

where x is a digital watermark signal; v is a transform coefficient into which the watermark signal is embedded; $\alpha$ is the digital watermark strength; and v' is a digital watermark inserted transform coefficient. For the obtained digital watermark inserted transform coefficient, inverse DCT method or inverse DFT is performed. Thus, a digital watermark inserted image is generated and output. In this algorithm, the digital watermark strength is represented by parameter $\alpha$ in the formula (2) or the formula (3).

Next, a digital watermark characteristic table generating unit that generates a digital watermark characteristic table stored in the storing unit 2001 of the system shown in FIG. 1 will be described. FIG. 2 is a block diagram showing the structure of a conventional digital watermark characteristic table generating unit. In FIG. 2, a digital watermark inserting portion 200 converts embedding data into proper data, inserts digital watermark information with the input digital watermark strength into the input image, and outputs the resultant digital watermark inserted image to an attack executing portion 201. The attack executing portion 201 attacks the digital watermark inserted image with a predetermined strength corresponding to an input attack parameter in a predetermined manner and outputs the attacked image to a digital watermark detecting portion 202.

The digital watermark detecting portion 202 detects a digital watermark from the attacked image that is received from the attack executing portion 201 and outputs the detected result to a digital watermark characteristic table generating portion 2201. An image quality deterioration amount calculating portion 203 calculates an image quality deterioration amount with both the digital watermark inserted image that is received from the digital watermark inserting portion 200 and the input image and outputs the calculated image quality deterioration amount to the digital watermark characteristic table generating portion 2201. A categorizing portion 204 categorizes the input image and outputs a category index corresponding to the categorized result to the digital watermark characteristic table generating portion 2201.

The digital watermark characteristic table generating portion 2201 obtains a robustness evaluation value against the attack and an image quality deterioration ratio, based on the detected result that is received from the digital watermark detecting portion 202, the digital watermark strength, the attack parameter, the image quality deterioration amount that is received from the image quality deterioration amount calculating portion 203, and the category index that is received from the categorizing portion 204, and it outputs the relation of the robustness evaluation value, the image quality deterioration ratio, and the digital watermark strength as a digital watermark characteristic table.

Next, the operation of the digital watermark characteristic table generating unit shown in FIG. 2 will be described. For easy understanding, several symbols necessary for explaining the operation of the digital watermark characteristic table generating unit will be defined.

The number of input images is denoted by I. The I input images are distinguished by an index i (where i=1, ..., I). The value of the attack parameter is denoted by x(j) (where j=1, ..., J). The attack parameter is a parameter for adjusting the attack strength. The category index k (where k=1, ..., K), the digital watermark strength s(m) (where m=1, ..., M), the image quality deterioration ratio D(k, m), and the attack robustness evaluation value V(k, m) are defined as described above. A category index for an input image i is denoted by k(i). An image quality deterioration amount for an input image i is denoted by d(i). When the category index is denoted by k, the digital watermark strength index is denoted by m, and the attack parameter index is denoted by j, the detected result and the detection ratio are denoted by y(k, m, j) and r(k, m, j), respectively.

Next, with reference to FIG. 2, the operation of the digital watermark characteristic table generating unit will be described. An input image i is supplied to the digital watermark inserting portion 200. Input embedding data is converted into digital watermark information. With a parameter of input digital watermark strength s(m), the digital watermark is inserted into the image. The obtained image is output as a digital watermark inserted image to the image quality deterioration amount calculating portion 203 and the attack executing portion 201.

The attack executing portion 201 attacks the digital watermark inserted image in a predetermined manner and outputs the attacked image to the digital watermark detecting portion 202. The attack strength is adjusted by the input attack parameter x(j). When the digital watermark inserted image is attacked by a noise adding attack, the attack parameter is an amount of noise power, noise amplitude, PSNR (Peak Signal to Noise Ratio), or the like. When the digital watermark inserted image is attacked as an enlarging attack or a shrinking attack, the attack parameter is an amount of enlargement/shrinkage magnification or equivalent amount.

The attacked image that is output from the attack executing portion 201 is input to the digital watermark detecting portion 202. The digital watermark detecting portion 202 detects a digital watermark from the attacked image. When the digital watermark detecting portion 202 has detected an embedded digital watermark, it outputs "1" as a detected result. When the digital watermark detecting portion 202 has not detected an embedded digital watermark, it outputs "0" as a detected result. When the digital watermark detecting portion 202 has detected part of an embedded digital watermark, it outputs a value between "0" and "1" (for example, "0.5") as a detected result. The data that is output from the digital watermark detecting portion 202 is input to the digital watermark characteristic table generating portion 2201.

Both the input image and the digital watermark inserted image that is output from the digital watermark inserting portion 200 are input to the image quality deterioration amount calculating portion 203. The image quality deterioration amount calculating portion 203 compares the input image with the digital watermark inserted image and calculates the image quality deterioration amount due to the inserted digital watermark. As the image quality deterioration amount, a PSNR value of the digital watermark inserted image against the original image or a WSNR (Weighted Signal to Noise Ratio) value in consideration of visual characteristics is used. Alternatively, a ratio of the deterioration to a JND (Just Noticeable Distortion), which is derived by dividing the differences between the digital watermark inserted image and the original input image by JND values after the JND values are calculated, can be used. The calculated image quality deterioration amount is output to the digital watermark characteristic table generating portion 2201.

In FIG. 2, the input image is also supplied to the categorizing portion 204. The operation of the categorizing portion 204 is the same as that of the categorizing portion 103 shown in FIG. 1. The categorizing portion 204 calculates a feature amount of the input image and categorizes the input image based on the calculated feature amount. Thereafter, the categorizing portion 204 outputs a category index that represents the category to the digital watermark characteristic table generating portion 2201.

The digital watermark characteristic table generating unit shown in FIG. 2 performs such a process for I input images i=1, ..., I. For each input image i, the procedures described above are performed with the M different digital watermark strength values s(m) (where m=1, ..., M). For each digital watermark strength s(m), the procedures described above are performed with the J different attack parameters x(j) (where j=1, ..., J). The detected results y(k(i), m, j), the digital watermark strength s(m), the index m, the attack parameter x(j), the index J, the image quality deterioration amount d(k(i), m), and the category index k(i) are supplied to the digital watermark characteristic table generating portion 2201. The digital watermark characteristic table generating portion 2201 generates and outputs a digital watermark characteristic table describing the relation between these input factors.

Next, the digital watermark characteristic table generating portion 2201(2303) will be described. FIG. 3 is a block diagram showing the structure of the digital watermark characteristic table generating portion 2201(2303). A detected result totaling portion 300 totals the detected result of the digital watermark detecting portion 202 for each attack parameter, each digital watermark strength, and each category index, calculates a detection ratio with the totaled result, and outputs the calculated detection ratio to a robustness evaluation value calculating portion 2301.

An image quality deterioration amount totaling portion 301 totals the image quality deterioration amount that is received from the digital watermark deterioration amount calculating portion 203 for each category index and each digital watermark strength, calculates an image quality deterioration ratio with the totaled image quality deterioration amount, and outputs the calculated image quality deterioration ratio to a data combining portion 2302.

Next, a robustness evaluation value calculating portion 2301 calculates an attack robustness evaluation value with the attack parameter and the detection ratio that is received from the detected result totaling portion 300 and outputs the calculated attack robustness evaluation value to the data combining portion 2302. For each category index, the data combining portion 2302 generates a table that describes the relation between the digital watermark strength, the image quality deterioration ratio, and the robustness evaluation value, and outputs the table as a digital watermark characteristic table.

Next, the operation of the digital watermark characteristic table generating portion shown in FIG. 3 will be described. The digital watermark detected result y(k(i), m, j) is input to the detected result totaling portion 300. The detected result totaling portion 300 has a storing means. The detected result totaling portion 300 totals the digital watermark detected result y(k(i), m, j) for each category index k, each digital watermark strength index m, and each attack parameter index j and calculates a mean value r(k, m, j) as a detection ratio, and outputs the detection ratio r(k, m, j) to the robustness evaluation value calculating portion 2301.

The robustness evaluation value calculating portion 2301 calculates an attack robustness evaluation value V(k, m) based on the detection ratio r(k, m, j) that is received from the detected result totaling portion 300 and outputs the attack robustness evaluation value V(k, m) to the data combining portion 2303. The operation of the robustness evaluation value calculating portion 2301 will be described later.

On the other hand, the image quality deterioration amount d(i) is input to the image quality deterioration amount totaling portion 301. The image quality deterioration amount totaling portion 301 has a storing means. The image quality deterioration amount totaling portion 301 totals the image quality deterioration amount d(i) for each category index k and each digital watermark strength index m, calculates the mean value D(k, m) as an image quality deterioration ratio, and outputs the calculated mean value D(k, m) to the data combining portion 2302.

The data combining portion 2302 combines the robustness evaluation value V(k, m) that is received from the robustness evaluation value calculating portion 2301, the image quality deterioration ratio D(k, m) that is received from the image quality deterioration amount totaling portion 301, and the digital watermark strength s(m) and generates and outputs a digital watermark characteristic table shown in FIG. 1 for each category index k. Next, the robustness evaluation value calculating method performed by the robustness evaluation value calculating portion 2301 shown in FIG. 3 will be described.

To calculate the robustness evaluation value, the variation of the detection ratio in the case that the attack parameter x is successively varied is considered. The robustness evaluation value V(k, m) is given by the following formula.

$$V(k, m) = \int_{-\infty}^{\infty} w(x) r(k, m, x) dx \quad (4)$$

where k is a category index; m is a digital watermark strength index; x is an attack parameter; r(k, m, x) is a detection ratio that is a function of the attack parameter x when the digital watermark strength index is m; and W(X) is a weighting function.

The weighting function W(X) determines the degree of contribution of the detection ratio at each attack parameter x to the robustness evaluation value V(k, m). When the weighting function is properly set, the user's sense against the deterioration due to an attack and attack frequency information can be affected to the evaluation value. In reality, the detection ratio against the digitized value x(j) is obtained rather than the detecting ratio against any attack parameter x. Thus, the robustness evaluation value V(k, m) is calculated by digitizing and approximating the formula (4).

Alternatively, the robustness evaluation value V(k, m) can be obtained corresponding to the following formula:

$$V(k, m) = \frac{1}{L} \int_{-\infty}^{\infty} T(r(k, m, x), \alpha) dx \quad (5)$$

where k is a category index; m is a digital watermark strength index; V(k, m) is a robustness evaluation value V(k, m); and L is a reference interval length of the attack parameter. T(x, α) is a thresholding function given by the following formula:

$$T(x, a) = \begin{cases} 1 & (x > \alpha) \\ 0 & (x \leq \alpha) \end{cases} \quad (6)$$

However, the second related art reference has the following problems.

As a first problem, it is difficult for the user to customize an attack robustness evaluation value calculating method. Although it is preferred for the user to freely designate a weighting function and a threshold value for calculating a robustness evaluation value, the digital watermark inserting system of the second related art reference uses a pre-calculated robustness evaluation value as an attack robustness evaluation value, it is difficult to tune the robustness evaluation value calculating method.

As a second problem, when a robustness evaluation value for a combination of a plurality of attacks is used for calculating the optimum digital watermark strength, the data amount to be stored adversely increases. Thus, it is necessary to reduce the data amount. In other words, according to the second related art reference, since all robustness evaluation values corresponding to combinations of a plurality of attacks should be stored, a huge amount of storage capacity is required. However, it is difficult to satisfy such a huge storage capacity.

SUMMARY OF THE INVENTION

An object of the present invention is to provide a digital watermark inserting system that allows the optimum digital watermark strength to be automatically calculated corresponding to a robustness evaluation value against an attack and an image quality deterioration ratio.

A first aspect of the present invention is a digital watermark inserting system for inserting digital watermark information into an input image, comprising a means for calculating a feature amount of the input image, categorizing the input image, and outputting a category index as the categorized result, a digital watermark characteristic calculating means for calculating an image deteriorating ratio and a robustness evaluation value against a digital watermark strength based on a robustness evaluation value calculation parameter and the category index, the robustness evaluation value calculation parameter being input by the user, a digital watermark strength calculating means for outputting the digital watermark strength to the digital watermark characteristic calculating means, deciding the optimum digital watermark strength based on digital watermark strength restriction information that is input by the user, and outputting the optimum digital watermark strength, and a digital watermark inserting means for converting input embedding data into digital watermark information, inserting the digital watermark information into the input image with an input parameter of the optimum digital watermark strength, and outputting the resultant image as a digital watermark inserted image.

A second aspect of the present invention is a digital watermark characteristic parameter table generating method for inserting digital watermark information into an input image, comprising the steps of calculating a feature amount of the input image, categorizing the input image with the calculated result, and outputting a category index as the categorized result, converting input embedding information into the digital watermark information, inserting the digital watermark information into the input image with input digital watermark strength, and generating a digital watermark inserted image as the inserted data, adjusting the strength of an attack with an input attack parameter, attacking the digital watermark inserted image with the adjusted attack strength, generating a resultant attacked image, detecting a digital watermark from the attacked image, outputting the detected result, comparing the input image with the digital watermark inserted image, calculating an image quality deterioration amount caused by the inserted digital watermark, and outputting the calculated the image quality deterioration ratio amount, and receiving the detected result of the digital watermark, the digital watermark strength, the attack parameter, the image quality deterioration amount, and the category index, totaling the detected results for each of combinations of the category index, the digital watermark strength, and the attack parameter, obtaining a detection ratio as the totaled result, totaling the image quality deterioration amount for each of combinations of the category index and the digital watermark strength, obtaining an image quality deterioration ratio as the totaled result, and calculating a digital watermark characteristic parameter table by using the detection ratio and the image quality deterioration ratio, and outputting the digital watermark characteristic parameter table.

A third aspect of the present invention is a record medium from which a computer reads a program that causes the computer to drive a digital watermark inserting system for inserting digital watermark information into an input image, the system comprising a means for calculating a feature amount of the input image, categorizing the input image, and outputting a category index as the categorized result, a digital watermark characteristic calculating means for calculating an image deteriorating ratio and a robustness evaluation value corresponding to a digital watermark strength based on a robustness evaluation value calculation parameter and the category index, the robustness evaluation value calculation parameter being input by the user, a digital watermark strength calculating means for outputting the digital watermark strength to the digital watermark characteristic calculating means deciding the optimum digital watermark strength based on digital watermark strength restriction information that is input by the user, and outputting the optimum digital watermark strength, and a digital watermark inserting means for converting input embedding data into digital watermark information, inserting the digital watermark information into the input image with an input parameter of the optimum digital watermark strength, and outputting the resultant image as a digital watermark inserted image.

A fourth aspect of the present invention is a record medium from which a computer reads a program that causes the computer to perform a method for inserting digital watermark information into an input image, the method comprising the steps of (a) calculating a feature amount of the input image, categorizing the input image, and outputting a category index as the categorized result, (b) digital watermark characteristic calculating means for calculating an image deteriorating ratio and a robustness evaluation value corresponding to a digital watermark strength based on a robustness evaluation value calculation parameter and the category index, the robustness evaluation value calculation parameter being input by the user, (c) digital watermark strength calculating means for outputting the digital watermark strength to step (b), deciding the optimum digital watermark strength based on digital watermark strength restriction information that is input by the user, and outputting the optimum digital watermark strength, and (d) digital watermark inserting means for converting input embedding data into digital watermark information, inserting the digital watermark information into the input image with an input parameter of the optimum digital watermark strength, and outputting the resultant image as a digital watermark inserted image.

Next, with reference to the accompanying drawings, the present invention will be described. A digital watermark inserting system according to the present invention comprises a means (103, FIG. 4) for calculating a feature amount of the input image, categorizing the input image and outputting a category index as the categorized result, a digital watermark characteristic calculating means (104, FIG. 4) for calculating an image deteriorating ratio and a robustness evaluation value corresponding to a digital watermark strength based on a robustness evaluation value calculation parameter and the category index, the robustness evaluation value calculation parameter being input by the user, a digital watermark strength calculating means (100, FIG. 4) for outputting the digital watermark strength to the digital watermark characteristic calculating means (104, FIG. 4), deciding the optimum digital watermark strength based on digital watermark strength restriction information that is input by the user, and outputting the optimum digital watermark strength, and a digital watermark inserting means (102, FIG. 4) for converting input embedding data into digital watermark information, inserting the digital watermark information into the input image with an input parameter of the optimum digital watermark strength, and outputting the resultant image as a digital watermark inserted image.

In the digital watermark inserting system according to the present invention, the digital watermark characteristic calculating means (104. FIG. 4) has a first storing means (101, FIG. 5) for storing a digital watermark characteristic parameter table for each of various category indexes, the digital watermark characteristic parameter table describing the relation of a digital watermark strength, an image detection ratio, and a detection ratio parameter, the detection ratio parameter describing a detection ratio curve/curved surface that approximates the variation of the detection ratio of the digital watermark information against an attack parameter, selecting a detection ratio characteristic parameter table corresponding to the category index, and outputting the image quality deterioration ratio and the detection ratio characteristic parameter corresponding to the digital watermark strength that is output from the digital watermark strength calculating means (100, FIG. 4), and a robustness evaluation value calculating means (105, FIG. 5) for obtaining the detection ratio curve/curved surface with the detection ratio characteristic parameter, performing a statistic process based on the robustness evaluation value calculation parameter that is input by the user, calculating the robustness evaluation value, and outputting the robustness evaluation value. In the digital watermark inserting system according to the present invention, the digital watermark characteristic calculating means (104, FIG. 4) has a second storing means (171, FIG. 6) for storing a digital watermark characteristic parameter table describing the relation of a category index, an image quality deterioration ratio curve parameter describing an image quality deterioration ratio curve that approximates the variation of the image quality deterioration ratio against a digital watermark strength, and a detection ratio characteristic general parameter that describes a detection ratio characteristic parameter curve approximating the variation of a detection ratio characteristic parameter against the digital watermark strength and outputting an image quality deterioration ratio curve parameter and a detection ratio characteristic general parameter corresponding to the category index, an image quality deterioration ratio calculating means (100, FIG. 4) for obtaining an image quality deterioration ratio curve with the image quality deterioration ratio curve parameter, calculating the image quality deterioration ratio corresponding to the digital watermark strength that is output from the digital watermark strength calculating portion, and outputting the calculated image quality deterioration ratio, and a robustness evaluation value calculating means (173, FIG. 6) for obtaining the detection ratio characteristic parameter curve with the detection ratio characteristic general parameter, calculating a detection ratio characteristic parameter corresponding to the digital watermark strength that is output from the digital watermark strength calculating portion, obtaining the detection ratio curve/curved surface with the calculated detection ratio characteristic parameter, performing a statistic process based on the robustness evaluation value calculation parameter that is input by the user, and outputting the calculated robustness evaluation value as the processed result.

In the digital watermark inserting system according to the present invention, the robustness evaluation value calculating means (105, FIG. 5 or 173, FIG. 6) obtains an inner product of the detection ratio curve and a weighting function so as to calculate the robustness evaluation value.

In the digital watermark inserting system according to the present invention, the robustness evaluation value calculating means (105, FIG. 5 or 173, FIG. 6) obtains a region of an attack parameter of which a detection ratio exceeds a predetermined threshold value with the detection ratio curve and calculates the robustness evaluation value based on the length of the region.

In the digital watermark inserting system according to the present invention, the detection ratio characteristic parameter is a detection ratio curve parameter that represents the detection ratio curve for a single attack.

In the digital watermark inserting system according to the present invention, the detection ratio characteristic parameter is composed of the detection ration curve parameter for a single attack and an attack correlation curved surface parameter that is a parameter that describes an attack correlation curved surface approximating an attack correlation value defined based on the ratio of the product of detection ratios of single attacks and a detection ratio for a complex attack, and the robustness evaluation value calculating means (105, FIG. 5) obtains the detection ratio curve for a single attack composing a complex attack with the detection ratio curve parameter for the single attack, obtains an attack correlation curved surface with the attack correlation curved surface parameter, obtains the detection ratio curved surface for the complex attack based on the product of the detection ratio curve for the single attack and the attack correlation curved surface, and calculates the robustness evaluation value.

In the digital watermark inserting system according to the present invention, the detection ratio general parameter is a detection ratio curve general parameter that represents a curve approximating the variation of the detection ratio curve parameter against a digital watermark strength for a single attack. In the digital watermark inserting system according to the present invention, the detection ratio characteristic general parameter is composed of a detection ratio curve general parameter for a single attack and an attack correlation curved surface general parameter that represents a curve approximating the variation of an attack correlation curve parameter against the digital watermark strength. The robustness evaluation value calculating means (173, FIG. 6) obtains the detection ratio curve for a single attack composing a complex attack with a detection ratio curve general parameter for the single attack, obtains an attack correlation curved surface with the attack correlation curved surface general parameter, obtains the detection ratio curved surface for the complex attack based on the product of the detection ratio curve for the single attacks and the attack correlation curved surface, and calculates the robustness evaluation value.

In the digital watermark inserting system according to the present invention, the attack correlation curved surface and the weighting function for a complex attack are a linear sum of a function separable for an attack parameter of each attack.

In the digital watermark inserting system according to the present invention, the restriction information of the digital watermark strength is an allowable limit value of the image quality deterioration ratio. The digital watermark strength calculating means decides the optimum digital watermark strength in the allowable limit value of the image quality deterioration ratio and outputs the decided optimum digital watermark strength.

In the digital watermark inserting system according to the present invention, the restriction information of the digital watermark strength is a limit value of a safety index against an attack. The digital watermark strength calculating means decides the optimum digital watermark strength in a range of which the robustness evaluation value against the attack exceeds the limit value of the safety index and outputs the decided optimum digital watermark strength.

In the digital watermark inserting system according to the present invention, the restriction information of the digital watermark is a weighting index that defines the balance of the image quality deterioration amount and the safety index. The digital watermark strength calculating means decides the ratio of the contribution of the image quality deterioration amount and the safety index for deciding the optimum digital watermark strength with the weighting index.

In the digital watermark inserting system according to the present invention, the digital watermark characteristic means (131, FIG. 7) has a digital watermark characteristic parameter table generating means (132, FIG. 7) for generating the digital watermark characteristic parameter table that is input to the digital watermark characteristic calculating means (131, FIG. 7).

In the digital watermark inserting system according to the present invention, the digital watermark characteristic parameter table generating means (132, FIG. 7) has a digital watermark inserting means (200, FIG. 12) for converting input embedding information into digital watermark information, inserting the digital watermark information into the input image with the input digital watermark strength, and generating the digital watermark inserted image, an attack image generating means (201, FIG. 12) for adjusting the strength of an attack with an input attack parameter against the digital watermark inserted image, and generating an attacked image, a digital watermark detecting menas (202, FIG. 12) for detecting a digital watermark from the attacked image and outputting the detected result, an image quality deterioration amount calculating means (203, FIG. 12) for comparing the input image with the digital watermark inserted image, calculating an image quality deterioration amount caused by the inserted digital watermark with the compared result, and outputting the calculated image quality deterioration amount, a categorizing means (204, FIG. 12) for calculating a feature amount of the input image, categorizing the input image with the calculated feature amount, and outputting a category index corresponding to the categorized result, and a digital watermark characteristic parameter table calculating means (205, FIG. 12) for receiving the detected result of the digital watermark, the digital watermark strength, the attack parameter, the image quality deterioration amount, and the category index, totaling the detected results of each of combinations of the category index, the digital watermark strength, and the attack parameter, obtaining a detection ratio as the totaled result, totaling an image quality deterioration amount of each of combinations of the category index and the digital watermark strength, obtaining a image quality deterioration ratio as the totaled result, calculating a digital watermark characteristic parameter table using the detection ratio and the image quality deterioration ratio, and outputting the calculated digital watermark characteristic parameter table.

In the digital watermark inserting system according to the present invention, the digital watermark characteristic parameter table calculating means has a detection ratio calculating means (300, FIG. 13) for totaling a detected result of the digital watermark information for each of the attack parameter, the digital watermark strength, and the category index, calculating detection ratio data with the totaled result, and outputting the calculated detection ratio data, an image quality deterioration ratio calculating means (301, FIG. 13) for totaling an image quality deterioration amount for each of the category index and the digital watermark strength and outputting the resultant statistic amount as an image quality deterioration ratio, a digital watermark characteristic extracting means (302, FIG. 13) for calculating detection ratio descriptive information describing the variation of the detection ratio data against the digital watermark strength, the attack parameter, and the category index and image quality deterioration ratio descriptive information describing the variation of the image quality deterioration ratio and outputting the detection ratio descriptive information and the image quality deterioration ratio descriptive information, and a data combining means (303, FIG. 13) for combining the digital watermark strength, the category index, the image quality deterioration ratio descriptive information, and the detection ratio descriptive information, generating a digital watermark characteristic parameter table as the combined result, and outputting the generated digital watermark characteristic parameter table.

In the digital watermark inserting system according to the present invention, the digital watermark characteristic extracting means has a detection ratio characteristic extracting means (320, FIG. 14) for approximating a function representing the variation of the detection ratio data against the attack parameter for each of the category index and the digital watermark strength with a curve/curved surface, calculating a detection ratio characteristic parameter describing the curve/curved surface, and outputting the calculated detection ratio characteristic parameter as the detection ration descriptive information. The image quality deterioration ratio is output as the image quality deterioration ratio descriptive information.

In the digital watermark inserting system according to the present invention, the detection ratio characteristic parameter calculated by the detection ratio characteristic extracting means (320, FIG. 14) is a detection ratio curve parameter for a single attack.

In the digital watermark inserting system according to the present invention, the detection ratio characteristic parameter calculated by the detection ratio characteristic extracting means (320, FIG. 14) is composed of a detection ratio curve parameter for a single attack and an attack correlation curved surface parameter describing the correlation of single attacks.

In the digital watermark inserting system according to the present invention, the digital watermark characteristic extracting means (302, FIG. 13) has a detection ratio characteristic calculating means (340, FIG. 15) for approximating a function that represents the variation of the detection ratio data against the attack parameter for each of the category index and the digital watermark strength with a curve/curved surface, calculating a detection ratio characteristic parameter that represents the curve/curved surface, approximating the variation of the detection ratio characteristic parameter against the digital watermark strength with a curve, obtaining a detection ratio characteristic general parameter that describes the curve, and outputting the detection ratio characteristic general parameter as the detection ratio descriptive information, and an image quality deterioration ratio characteristic extracting means (341, FIG. 15) for approximating the variation of the image quality deterioration ratio against the digital watermark strength with a curve, calculating an image quality deterioration ratio curve parameter that describes the curve, and outputting the image quality deterioration ratio curve parameter as the image quality deterioration ratio descriptive information.

In the digital watermark inserting system according to the present invention, the detection ratio characteristic parameter and the calculated detection ratio characteristic general parameter calculated by the detection ratio characteristic calculating means (340, FIG. 15) are a detection ratio curve parameter for a single attack and a detection ratio curve general parameter for a single attack, respectively.

In the digital watermark inserting system according to the present invention, the detection ratio characteristic parameter calculated by the detection ratio characteristic calculating means (340, FIG. 15) is composed of a detection ratio curve parameter for a single attack and an attack correlation curved surface parameter that describes the correlation of single attacks. The detection ratio characteristic general parameter calculated by the detection ratio characteristic calculating means (340, FIG. 15) is composed of a detection ratio curve general parameter for a single parameter and an attack correlation cured surface general parameter.

These and other objects, features and advantages of the present invention will become more apparent in light of the following detailed description of a best mode embodiment thereof as illustrated in the accompanying drawings.

BRIEF DESCRIPTION OF DRAWINGS

FIG. 6 is a block diagram showing a second example of the structure of the digital watermark characteristic calculating portion 104 according to the present invention.

FIG. 7 is a block diagram showing the structure of a second embodiment of the present invention;

FIG. 8 is a block diagram showing the structure of a third embodiment of the present invention;

FIG. 12 is a block diagram showing the structure of a digital watermark characteristic parameter table generating unit 132 shown in FIG. 7 according to the present invention;

FIG. 15 is a schematic diagram showing a second example of the structure of the digital watermark characteristic extracting portion 302 shown in FIG. 13 according to the present invention;

FIGS. 16A to 16D are graphs showing real examples of a detection ratio curve calculated according to the present invention;

FIGS. 18A to 18D are graphs showing real examples of a detection ratio curve calculated according to the present invention;

FIGS. 19A and 19B are graphs showing real examples of an image quality deterioration curve calculated according to the present invention;

FIGS. 24A and 24B are graphs showing real examples of an attack correlation value and an attack correlation curved surface calculated according to the present invention; and FIGS. 25A to 25C are graphs showing examples of an approximation curve of an attack correlation curved surface parameter calculated against an attack correlation curved surface parameter of the graph shown in FIG. 24B.

DESCRIPTION OF PREFERRED EMBODIMENTS

Next, with reference to the accompanying drawings, embodiments of the present invention will be described.

[First Embodiment]

Figure 4:
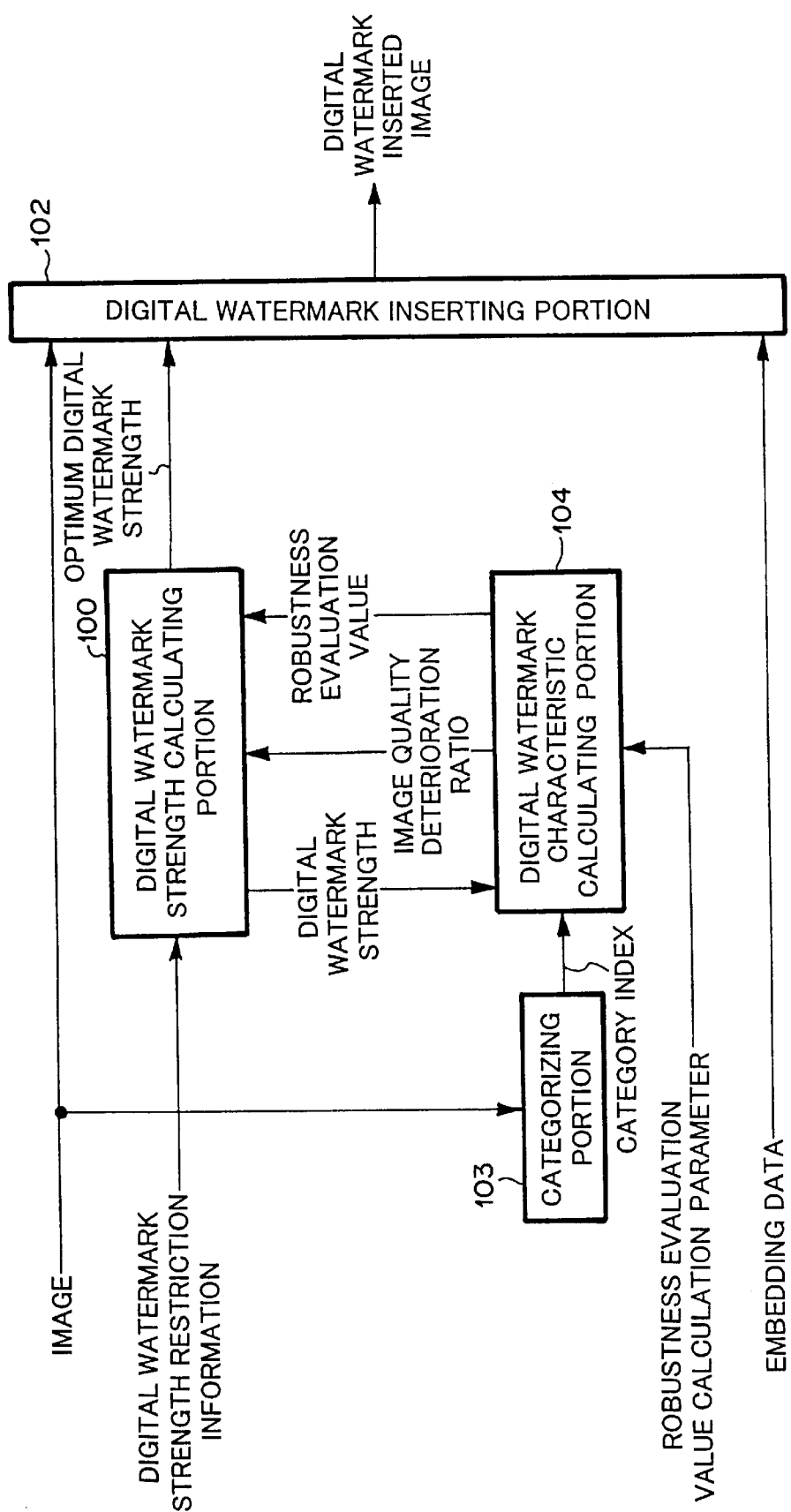
FIG. 4 is a block diagram showing a first example of the structure of the system according to the present invention.

FIG. 4 is a block diagram showing the structure of a digital watermark inserting system according to a first embodiment of the present invention. The digital watermark inserting system according to the first embodiment comprises a categorizing portion 103, a digital watermark characteristic calculating portion 104, a digital watermark strength calculating portion 100, and a digital watermark inserting portion 102. The digital watermark characteristic calculating portion 104 uses a robustness evaluation value calculation parameter. The digital watermark strength calculating portion 100 calculates digital watermark strength with the digital watermark strength restriction information.

The categorizing portion 103 calculates a feature amount of an input image, categorizes the image based on the obtained feature amount, and outputs the categorized result as a category index to the digital watermark characteristic calculating portion 104. The digital watermark characteristic calculating portion 104 calculates an image quality deterioration ratio and a robustness evaluation value for the digital watermark strength that is output from the digital watermark strength calculating portion 100 based on the category index that is output from the categorizing portion 103 and a robustness evaluation value calculation parameter that is input by the user and outputs the calculated image quality deterioration ratio and robustness evaluation value to the digital watermark strength calculating portion 100.

In addition, the digital watermark strength calculating portion 100 outputs various values of the digital watermark strength based on the digital watermark strength restriction information to the digital watermark characteristic calculating portion 104, decides the optimum digital watermark strength based on the image quality deterioration ratio and robustness evaluation value (against the digital watermark strength) received from the digital watermark characteristic calculating portion 104 and based on the digital watermark strength restriction information that is input by the user, and outputs the decided optimum digital watermark strength to a digital watermark inserting portion 102.

The digital watermark inserting unit 102 converts embedding data into a digital watermark, inserts the digital watermark into the image with the optimum digital watermark strength that is received from the digital watermark strength calculating portion 100, and outputs the resultant image as a digital watermark inserted image. Next, the operation of the digital watermark inserting system shown in FIG. 4 will be described.

An input image is supplied to the categorizing portion 103. The operation of the categorizing portion 103 is the same as that of the digital watermark inserting system shown in FIG. 1. The categorizing portion 103 categorizes the input image and outputs the categorized result as a category index. The feature amount used in the categorizing portion 103 is for example an activity of an image, the mean value of JND, the number of colors for use, entropy, or the like. Alternatively, the category may be used to distinguish image types such as medical images, CG, animation, and so forth. With the feature amount of the image, the image type may be automatically predicted. Moreover, the user may explicitly designate the category of an input image.

The category index that is output from the categorizing portion 103 is input to the digital watermark characteristic calculating portion 104. The digital watermark characteristic calculating portion 104 calculates an image quality deterioration ratio and a robustness evaluation value corresponding to the digital watermark strength that is output from the digital watermark strength calculating portion 100 with an image quality deterioration ratio descriptive information and the detection ratio descriptive information stored in a storing unit shown in FIG. 5 (the storing unit will be described later) and outputs the calculated image quality deterioration ratio and robustness evaluation value to the digital watermark strength calculating portion 100.

The image quality deterioration ratio descriptive information may be an image quality deterioration ratio or an image quality deterioration ratio curve parameter that is a parameter of a curve that approximates the variation of an image quality deterioration ratio against a digital watermark strength (hereinafter, the curve is referred to as image quality deterioration ratio curve).

On the other hand, the detection ratio descriptive information may be a parameter that describes a curve/curved surface that approximates the variation of a detection ratio against an attack parameter (hereinafter, the curve/curved surface is referred to as detection ratio curve/curved surface) or a parameter of a curve that approximates the variation of a detection ratio characteristic parameter against a digital watermark strength (hereinafter, this curve and this parameter are referred to as detection ratio characteristic parameter curve and detection ratio characteristic general parameter, respectively).

In the case of a single attack composed of a single process, the detection ratio characteristic parameter is a detection ratio curve parameter that is a curve parameter that approximates the variation of a detection ratio against an attack parameter. In the case of a complex attack that is a combination of a plurality of processes, the detection ratio characteristic parameter is composed of a detection ratio curve parameter against a single attack and an attack correlation curved surface parameter that approximates the correlation values of single attacks.

In the case of a single attack, the detection ratio characteristic general parameter is a detection ratio curve general parameter that is a curve parameter that approximates the variation of a detection ratio curve parameter against a digital watermark strength. In the case of a complex attack, the detection ratio characteristic general parameter is composed of a detection ratio curve general parameter against a single attack and an attack correlation curved surface parameter that is a curve parameter that approximates the variation of an attack correlation curved surface parameter against a digital watermark strength.

The structure and operation of the digital watermark characteristic calculating portion 104 depend on whether the image quality deterioration ratio descriptive information is an image quality deterioration ratio or an image quality deterioration ratio curve parameter. In addition, the structure and operation of the digital watermark characteristic calculation portion 104 depend on whether the detection ratio descriptive information is a detection ratio characteristic parameter or a detection ratio characteristic general parameter. Moreover, the structure and operation of the digital watermark characteristic calculation portion 104 depend on whether the considered attack is a single attack or a complex attack. The structure and operation of the digital watermark characteristic calculating portion 104 in these cases will be described later.

A robustness evaluation value that is output from the digital watermark characteristic calculating portion 104 may be a robustness evaluation value for one attack or a statistic amount of which a statistic process such as weighted means method is performed for robustness evaluation values calculated for various single/complex attacks. When a means value is calculated, weights to individual attacks may be input as a robustness evaluation value calculation parameter to the digital watermark characteristic calculating portion 104. The user may vary the weights.

Figure 1:
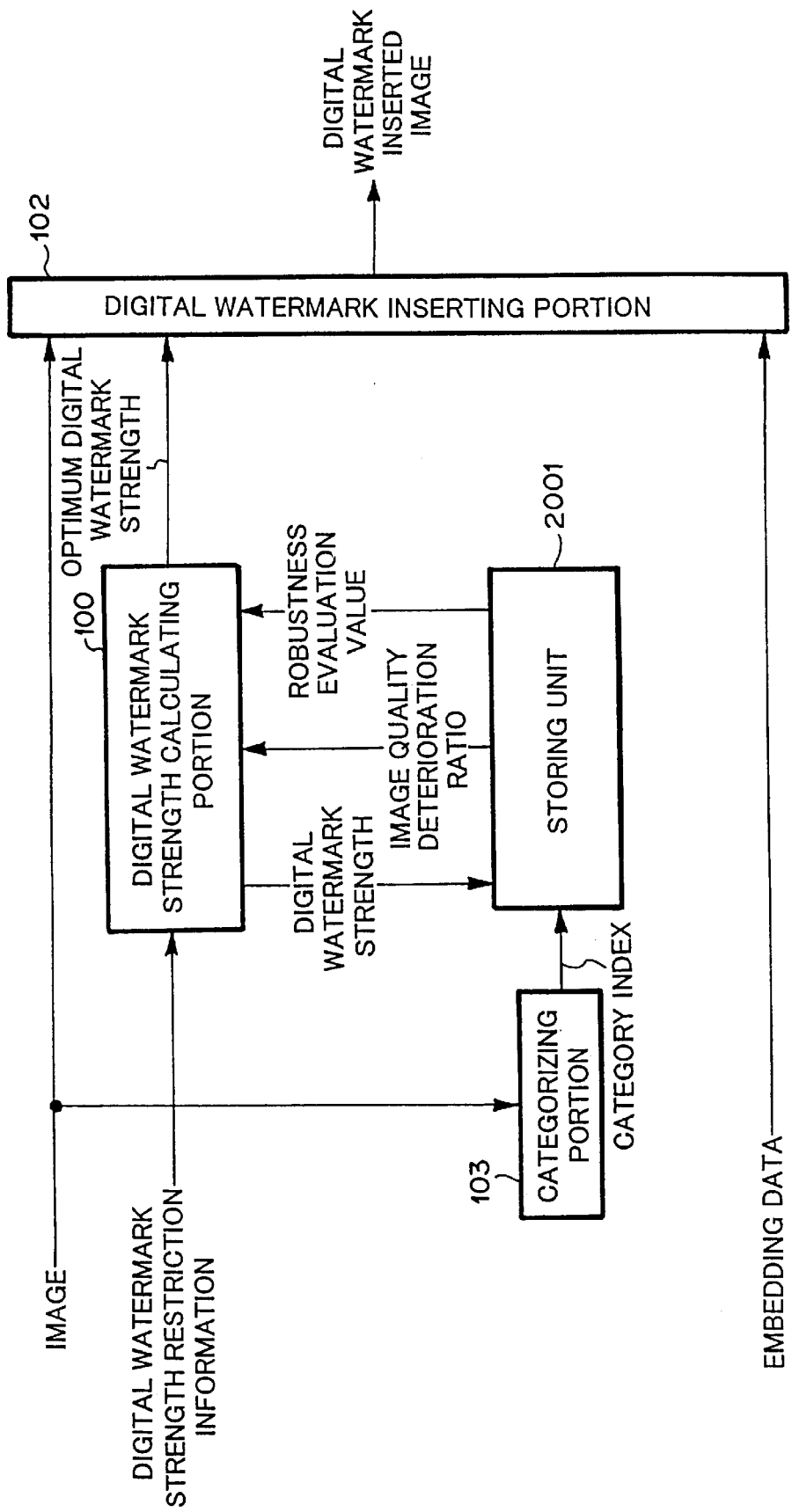
FIG. 1 is a block diagram showing the structure of a conventional digital watermark inserting system.

The operation of the digital watermark strength calculating portion 100 is the same as the operation of the digital watermark inserting system shown in FIG. 1. An input image is supplied to the system. The categorizing portion 103 calculates a category index of the input image and then calculates a digital watermark strength that maximizes the value of the formula 1 as the optimum digital watermark strength.

The optimum digital watermark strength that is output from the digital watermark strength calculating portion 100 is input to the digital watermark inserting portion 102. The operation of the digital watermark inserting portion 102 is the same as that of the conventional system. The digital watermark inserting portion 102 converts input embedding data into a digital watermark, inserts the digital watermark into the input image, and outputs the resultant image as a digital watermark inserted image.

In the above-described digital watermark inserting system, an image quality deterioration limit value D0 may be changed as digital watermark strength restriction information. When the user does not designate the limit value D0, a predetermined value is used as a default value. When the user designates the limit value D0, it is used. Thus, the user can adjust image quality deterioration caused by an inserted digital watermark.

In the above-described digital watermark inserting system, a safety limit value V0 against an attack may be changed as digital watermark strength restriction information. When the user does not designate the limit value V0, a predetermined value is used as a default value. When the user designates the limit value V0, it is used. Thus, the user can adjust the robustness of a digital watermark against an attack.

In the above-described digital watermark inserting system, the parameter "a" of the formula (1) that is a weighting index that allows an image quality deterioration amount of an objective function and a safety index to be balanced can be changed as digital watermark strength restriction information. When the user does not designate the parameter "a", a predetermined value is used as a default value. When the user designates the parameter "a", it is used. Thus, the user can selectively emphasize the deterioration of the image quality or the robustness against an attack.

In addition, the image quality deterioration permission limit value D0, the attack safety index limit value V0, and the weighting index "a" for emphasizing either the image quality deterioration amount or the safety index may be changed as digital watermark strength restriction information. The user can designate these values. When the user does not designate these values, predetermined values are used as default values. Thus, the user can freely adjust an image quality deterioration permission limit value, an attack safety index limit value, and the balance between image quality deterioration and an attack.

Next, with reference to FIG. 4, the structure and operation of the digital watermark characteristic calculating portion 104 in the case that the image quality deterioration ratio descriptive information is an image quality deterioration ratio and the detection ratio descriptive information is a detection ratio characteristic parameter will be described.

Figure 5:
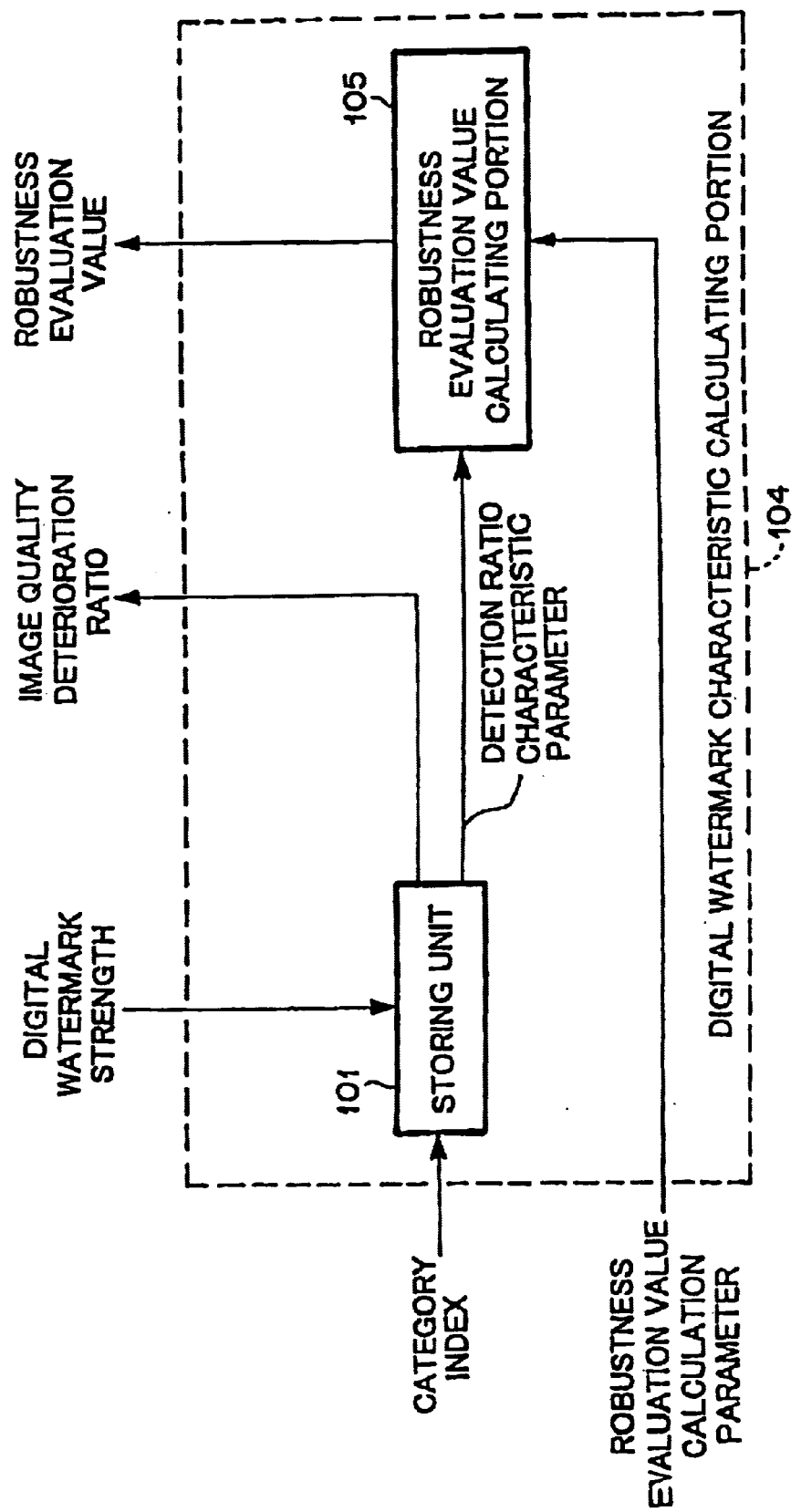
FIG. 5 is a block diagram showing a first example of the structure of a digital watermark characteristic calculating portion 104 according to the present invention.

FIG. 5 is a block diagram showing the structure of the digital watermark characteristic calculating portion 104. A storing unit 101 selects a digital watermark characteristic parameter table corresponding to a category index that is received from the categorizing portion 103 shown in FIG. 4 and outputs an image quality deterioration ratio corresponding to a digital watermark strength that is received from the digital watermark strength calculating portion 100 shown in FIG. 4 to the digital watermark strength calculating portion 100. In addition, the storing unit 101 outputs a detection ratio characteristic parameter to a robustness evaluation value calculating portion 105. The robustness evaluation value calculating portion 105 obtains a detection ratio curve/curved surface that approximates the relation of a detection ratio and an attack parameter with the detection ratio characteristic parameter that is received from the storing unit 101, calculates a robustness evaluation value based on a robustness evaluation value calculation parameter that is input by the user, and outputs the calculated robustness evaluation value to the digital watermark strength calculating portion 100 shown in FIG. 4.

Next, the operation of the digital watermark characteristic calculating portion shown in FIG. 5 will be described. First of all, the operation of the digital watermark characteristic calculating portion in the case of a single attack will be described. In this case, the detection ratio characteristic parameter is a detection ratio curve parameter.

A category index that is output from the categorizing portion 103 shown in FIG. 4 is input to the storing unit 101. The storing unit 101 stores digital watermark characteristic parameter tables for individual category indexes. Each of the digital watermark characteristic parameter tables describe the relation between a digital watermark strength, an image quality deterioration ratio, and a detection ratio curve parameter. Table 2 shows a digital watermark characteristic parameter table for a category index k.

TABLE 2

| Digital watermark strength | Image quality deterioration ratio | Detection ratio curve parameter |
| --- | --- | --- |
| S(1) | D(k, 1) | c1(k, 1), c2(k, 1), . . . |
| S(2) | D(k, 2) | c1(k, 2), c2(k, 2), . . . |
| . . . | . . . | . . . |
| S(M) | D(k, M) | c1(k, M), c2(k, M), . . . |

In this example, when a category index and a digital watermark strength index are denoted by k and m, respectively, a detection ratio curve parameter is denoted by c1(k, m), c2(k, m), . . .

Figure 9A:
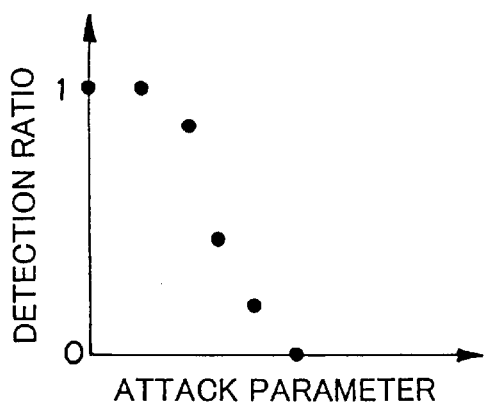
FIGS. 9A to 9D are graphs showing examples of a detection ratio approximating method.
Figure 9B:
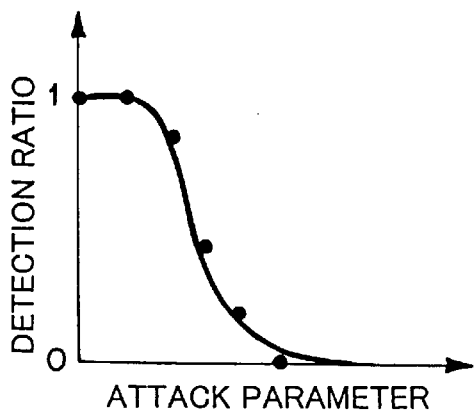

For example, in the case where the detection ratio varies with the attack parameter as shown in FIG. 9A (where x=0 corresponds to no attack), it is approximated with a logistic curve expressed by the following formula as shown in FIG. 9B:

$$r(x) = \frac{1}{1 + \exp(c_1(x + c_2))} \quad (7)$$

Figure 9C:
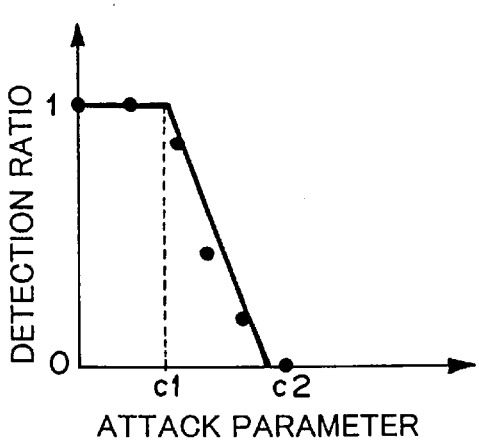

Alternatively, it is approximated with a graph of broken lines expressed by the following formula as shown in FIG. 9C:

$$r(x) = \frac{1}{c_1 - c_2}(x - c_2) \quad (8)$$

Figure 9D:
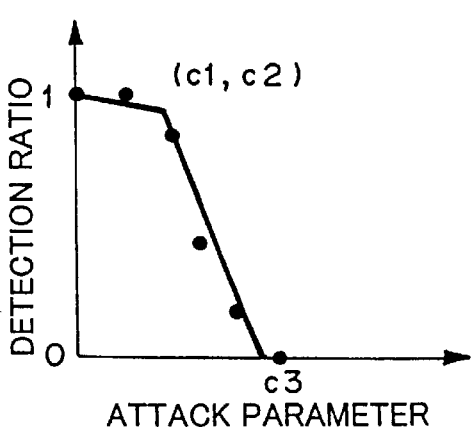
Figure 10A:
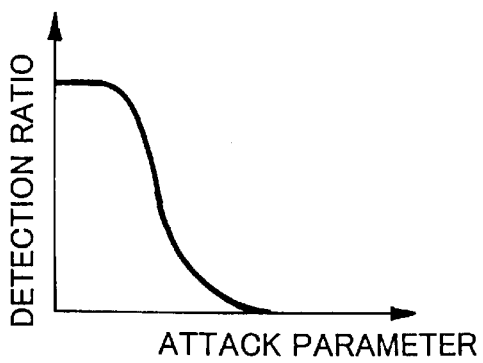
FIGS. 10A to 10D are graphs showing examples of a digitizing process in a robustness evaluation value calculating method according to the present invention.
Figure 10B:
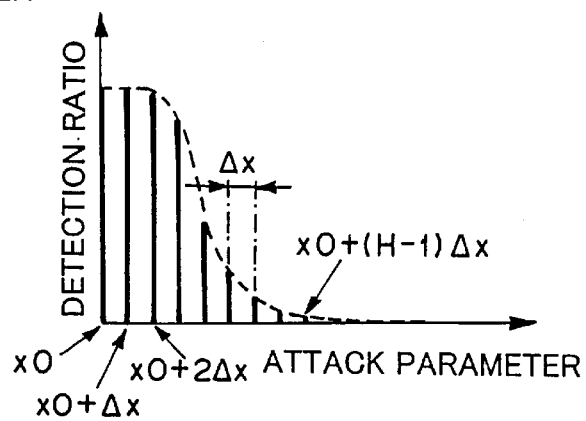
Figure 10C:
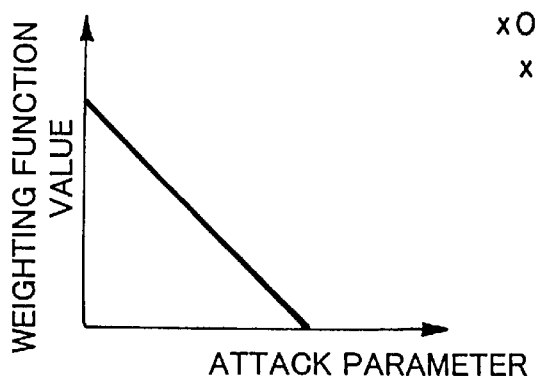
Figure 10D:
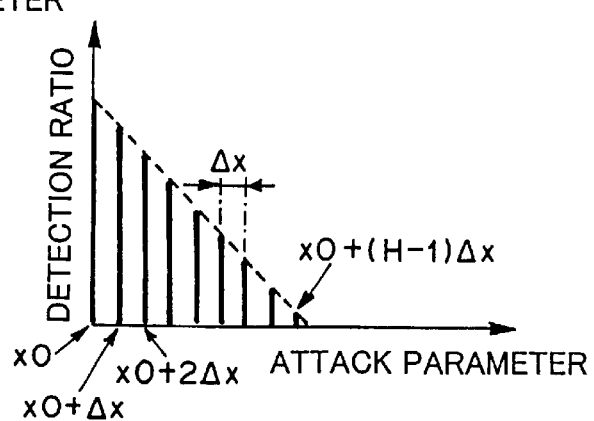

Alternatively, it is approximated with a graph of broken lines expressed by the following formula as shown in FIG. 9D:

$$r(x) = \begin{cases} -\frac{1-c_2}{c_2}x + 1 & (0 \le x < c_1) \\ -\frac{c_2}{c_3 - c_1}(x - c_3) & (c_1 \le x \le c_3) \end{cases} \quad (9)$$

In the formula (7), c1 and c2 are detection ratio curve parameters. In the formula (8), c1 and c2 are detection ratio curve parameters. In the formula (9), c1, c2, and c3 are detection ratio curve parameters.

Feature amounts used as parameters are not limited as long as they have the same degree of freedom. For example, instead of c1 and c2 of the formula (8), the slope of a straight line and the value of an intercept may be used as detection ratio curve parameters. In addition, other approximation curves may be used. For example, a fraction function expressed by the following formula may be used:

$$r(x) = \frac{1}{1 + c_1 x + c_2 x^2} \quad (10)$$

Alternatively, an exponential function expressed by the following formula may be used:

$$r(x) = \exp(-c_1(x - c_2)) \quad (11)$$

In the function expressed by the formula (10), c1 and c2 are detection ratio curve parameters. In the function expressed by the formula (11), c1 and c2 are detection ratio curve parameters. One of these curves can be properly selected for each attack.

In the example, the case that the state of x=0 represents that there is no attack was described. Alternatively, the above-described curve can also be applied in other cases by shifting or inverting it.

The storing unit 101 has a digital watermark characteristic table shown in Table 2. The storing unit 101 selects a digital watermark parameter characteristic table corresponding to a category index k that is received from the categorizing portion 103. A digital watermark strength s(m) is input to the storing unit 101 from the digital watermark strength calculating portion 100 and then outputs an image quality deterioration ratio D(k, m) to the digital watermark strength calculating portion 100. On the other hand, the storing unit 101 outputs detection ratio characteristic parameters c1(k, m), c2(k, m), . . . to the robustness evaluation value calculating portion 105.

The robustness evaluation value calculating portion 105 obtains a curve that represents the relation of a detection ratio and an attack parameter with the detection ratio curve parameters c1(k, m), c2(k, m), . . . that are received from the storing unit 101 and calculates a robustness evaluation value. The robustness evaluation value calculating portion 105 has designated types of curves for individual attacks. Thus, the robustness evaluation value calculating portion 105 decides the shape of the curve based on an input detection ratio curve parameter value. Alternatively, the robustness evaluation value calculating portion 105 may select one of several types of curves. In this case, an index that designates the type of a curve is contained in the detection ratio curve parameter. Hereinafter, a phrase "obtaining a curve/curved surface" represents that the shape of a curve is decided based on an input parameter.

With input detection ratio curve parameters, a detection ratio curve that represents the relation of an attack parameter and a detection ratio that are expressed by the formula (7) is obtained by the following formula:

$$r(k, m, x) = \frac{1}{1 + \exp(c_1(k, m) + c_2(k, m)x)} \quad (12)$$

Next, with the formulas (4) and (5), a robustness evaluation value $V(k, m)$ is calculated. The robustness evaluation value calculating portion 105 has a storing means that stores data of a weighting function $w(x)$ and a threshold value $a$.

When a robustness evaluation value is really calculated, as shown in FIGS. 10A to 10D, a detection ratio $r(k, m, x)$ and a weighting function $w(x)$ are digitized and calculated using the following formula:

$$V(k, m) = \sum_{k=1}^{H} w(x_0 + h\Delta x) r(k, m, x_0 + h\Delta x) \Delta x \quad (13)$$

or the following formula:

$$V(k, m) = \frac{1}{L} \sum_{k=1}^{H} T(r(k, m, x_0 + h\Delta x), a) \Delta x \quad (14)$$

Alternatively, a function may be approximated and integrated using such as Simpson's formula or trapezoid formula.

In addition, before a digital watermark is inserted, the user can change the weighting function and the threshold value. In FIG. 4, the evaluation value calculation parameter is data that represents a weighting function or a threshold value. When the weighted mean of robustness evaluation values of a plurality of attacks is obtained and output as a robustness evaluation value to the digital watermark strength calculating portion 100, the evaluation value calculation parameter is a weighting coefficient. When the user does not designate these values, predetermined values stored in the storing unit are used as default values. When the user designates these values, they are used. With the changed weighting function and threshold value or weighting coefficients of individual attacks, the robustness evaluation value is calculated.

Next, an attack correlation curved surface will be described. Thereafter, the operation of the digital watermark characteristic calculating portion shown in FIG. 5 in the case of a complex attack will be described. In this case, the detection ratio characteristic parameter is composed of a detection ratio curve parameter of each single attack composing the complex attack and an attack correlation curved surface parameter.

The attack correlation curved surface is a curved surface that represents the relation of detection ratios of individual single attacks composing the complex attack and the detection ratio of the complex attack. In the following example, the operation of the digital watermark characteristic calculating portion in the case of a complex attack composed of two single attacks (hereinafter referred to as attack 1 and attack 2) will be described. However, it should be noted that the present invention can be applied to a complex attack composed of more than two single attacks. The detection ratio of the attack 1 against the attack parameter value that is x1 is denoted by $r_1(x_1)$. The detection ratio of the attack 2 against the attack parameter value that is x2 is denoted by $r_2(x_2)$. The detection ratio of the complex attack is denoted by $r_{1,2}(x_1, x_2)$.

When attacks are combined, if there is no synergism effect thereof, it is predicted that the detection ratio is expressed by the following formula:

$$r_{1,2}(x_1, x_2) \approx r_1(x_1) r_2(x_2) \quad (15)$$

On the other hand, if there is a synergist effect, the formula (15) is not satisfied. In this case, a function that represents the synergism effect of the combination of attacks is expressed by the following formula:

$$z_{1,2}(x_1, x_2) = \frac{r_{1,2}(x_1, x_2)}{r_1(x_1) r_2(x_2)} \quad (16)$$

The formula (16) is referred to as attack correlation value. A curved surface that approximates the variation of an attack correlation value against an attack parameter is referred to as attack correlation curved surface. If there is no synergism effect of a combination of attacks, $z_{1,2}(x_1, x_2)$ is always 1.

Assuming that the state of which both attack parameters x1 and x2 are 0 represents no attacks, the following formula is satisfied:

$$\begin{cases} r_{1,2}(x_1, 0) = r_1(x_1) \\ r_{1,2}(0, x_2) = r_2(x_2) \end{cases} \quad (17)$$

In addition, basically, the following relation is satisfied:

$$r_1(0) = r_2(0) = 1 \quad (18)$$

Thus, the following relation is satisfied:

$$z_{1,2}(x_1, 0) = z_{1,2}(0, x_2) = 1 \quad (19)$$

Next, the operation of the digital watermark characteristic portion shown in FIG. 5 will be described.

A category index that is output from the categorizing portion 103 shown in FIG. 4 is input to the storing unit 101. For each category index, in addition to the table 2, which describes the relation between a digital watermark strength, an image quality deterioration ratio, and a detection ratio curve parameter against a single attack, the storing unit 101 stores a digital watermark characteristic parameter table that describes the relation between a digital watermark strength and an attack correlation curved surface parameter for each category index k. Table 3 shows the digital watermark characteristic parameter table.

TABLE 3

| Digital watermark strength | Attack correlation curved surface parameter |
|---|---|
| s(1) | q1(k, 1), q2(k, 1), . . . |
| s(2) | q1(k, 2), q2(k, 2), . . . |
| . . . | . . . |
| s(M) | q1(k, M), q2(k, M), . . . |

In Table 3, k is a category index; m is a digital watermark strength index; and q1(k, m), q2(k, m), . . . are attack correlation curved surface parameters.

For example, in each single attack composing a complex attack, when the state of which the value of the attack parameter is 0 represents that there is no attack, it can be approximated by functions expressed by the following formulas:

$$z_{1,2}(x_1, x_2) = \frac{1}{1 + q_1 x_1^{q_2} x_2^{q_3}} \quad (20)$$

where q1, q2, and q3 are attack correlation curved surface parameters:

$$z_{1,2}(x_1, x_2) = 1 - \frac{1}{(1 + \exp(q_1 + q_2 x_1))(1 + \exp(q_3 + q_4 x_2))} \quad (21)$$

where q1, q2, q3, and q4 are attack correlation curved surface parameters. A curve to be used depends on a combination of types of attacks. Thus, a proper curve is selected for each complex attack.

The storing unit 101 stores the digital watermark characteristic parameter tables shown in Tables 2 and 3. In accordance with the category index k that is output from the categorizing portion 103, the storing unit 101 selects a proper digital watermark parameter characteristic table. When a digital watermark strength s(m) is input to the storing unit 101 from the digital watermark strength calculating portion 100, the storing unit 101 outputs an image quality deterioration ratio D(k, m) to the digital watermark strength calculating portion 100. On the other hand, the storing unit 101 outputs detection ratio characteristic parameters c1(k, m), c2(k, m), . . . for a single attack and attack correlation curved surface parameters q1(k, m), q2(k, m), . . . to the robustness evaluation value calculating portion 105.

The robustness evaluation value calculating portion 105 obtains an attack correlation curved surface with the attack correlation curved surface parameters q1(k, m), q2(k, m), . . . that are input from the storing unit 101. In other words, when an approximation is performed with the formula (20), the attack correlation curved surface is obtained by the following formula:

$$z_{1,2}(k, m, x_1, x_2) = \frac{1}{1 + q_1(k, m) x_1^{q_2(k,m)} x_2^{q_1(k,m)}} \quad (22)$$

Next, with the detection ratio curve parameters c1(k, m), c2(k, m), . . . for single attacks, a detection ratio curve for each single attack composing the complex attack is obtained. With the obtained attack correlation curved surface and the detection ratio curve, the detection ratio curved surface for the complex attack is obtained by the following formula:

$$r_{1,2}(k,m,x_1,x_2) = r_1(k,m,x_1) r_2(k,m,x_2) z_{1,2}(x_1,x_2) \quad (23)$$

With the following formulas that are equivalent to the formulas (4) and (5) for single attacks, a robustness evaluation value is calculated. When a robustness evaluation value is really calculated using the follow formulas, as with the case for a single attack, a detection ratio, an attack correlation curved surface, and a weighting function are digitized and calculated:

$$V(k, m) = \int\int w_{1,2}(x_1, x_2) r_{1,2}(k, m, x_1, x_2) dx_1 dx_2 \quad (24)$$

$$= \int\int w_{1,2}(x_1, x_2) r_1(k, m, x_1) r_2(k, m, x_2) z_{1,2}(x_1, x_2) dx_1 dx_2$$

$$V(k, m) = \frac{1}{L} \int\int T(r_{1,2}(k, m, x_1, x_2), \alpha) dx_1 dx_2 \quad (25)$$

$$= \frac{1}{L} \int\int T(r_1(k, m, x_1) r_2(k, m, x_2) z_{1,2}(x_1, x_2), \alpha) dx_1, dx_2$$

The robustness evaluation value calculating portion 105 has a storing means that stores data of a weighting function w1,2(x1, x2) and a threshold value $\alpha$.

When the weighting function w1,2(x1, x2) is a separable for the attack parameters x1 and x2 and the attack correlation curved surface z1,2(x1, x2) is the linear sum of a separable function as with the formula (21) (namely, the following formulas are satisfied):

$$w_{1,2}(x_1, x_2) = w_1(x_1) w_2(x_2) \quad (26)$$

$$w_{1,2}(x_1, x_2) = w_1(x_1) w_2(x_2) \quad (26)$$

$$z_{1,2}(x_1, x_2) = \sum_i Z_1^{(i)}(x_1) z_2^{(i)}(x_2) \quad (27)$$

the right side of the formula (24) can be expressed as follows:

$$\sum_i \int w_1(x_1) r_1(k, m, x_1) z_1^{(i)}(k, m, x_1) dx_1 \int w_2(x_2) r_2(k, m, x_2) z_2^{(i)}(k, m, x_2) dx_2 \quad (28)$$

Thus, after an integrating calculation is performed for each single attack, the results are multiplied and added. Thus, the robustness evaluation value V(k, m) can be calculated. Consequently, the calculation amount can be remarkably reduced. In particular, in the case of z1,2(x1, x2)=1, only by calculating the product of the robustness evaluation values of single attacks, the robustness evaluation value of a complex attack can be derived.

Next, with reference to FIG. 6, the structure and operation of the digital watermark characteristic general parameter 104 shown in FIG. 4 in the case that information that represents an image quality deterioration ratio is an image quality deterioration ratio curve parameter and information that represents a detection ratio characteristic general parameter will be described.

FIG. 6 is a block diagram showing an example of the structure of the digital watermark characteristic calculating portion according to the first embodiment of the present invention.

Figure 3:
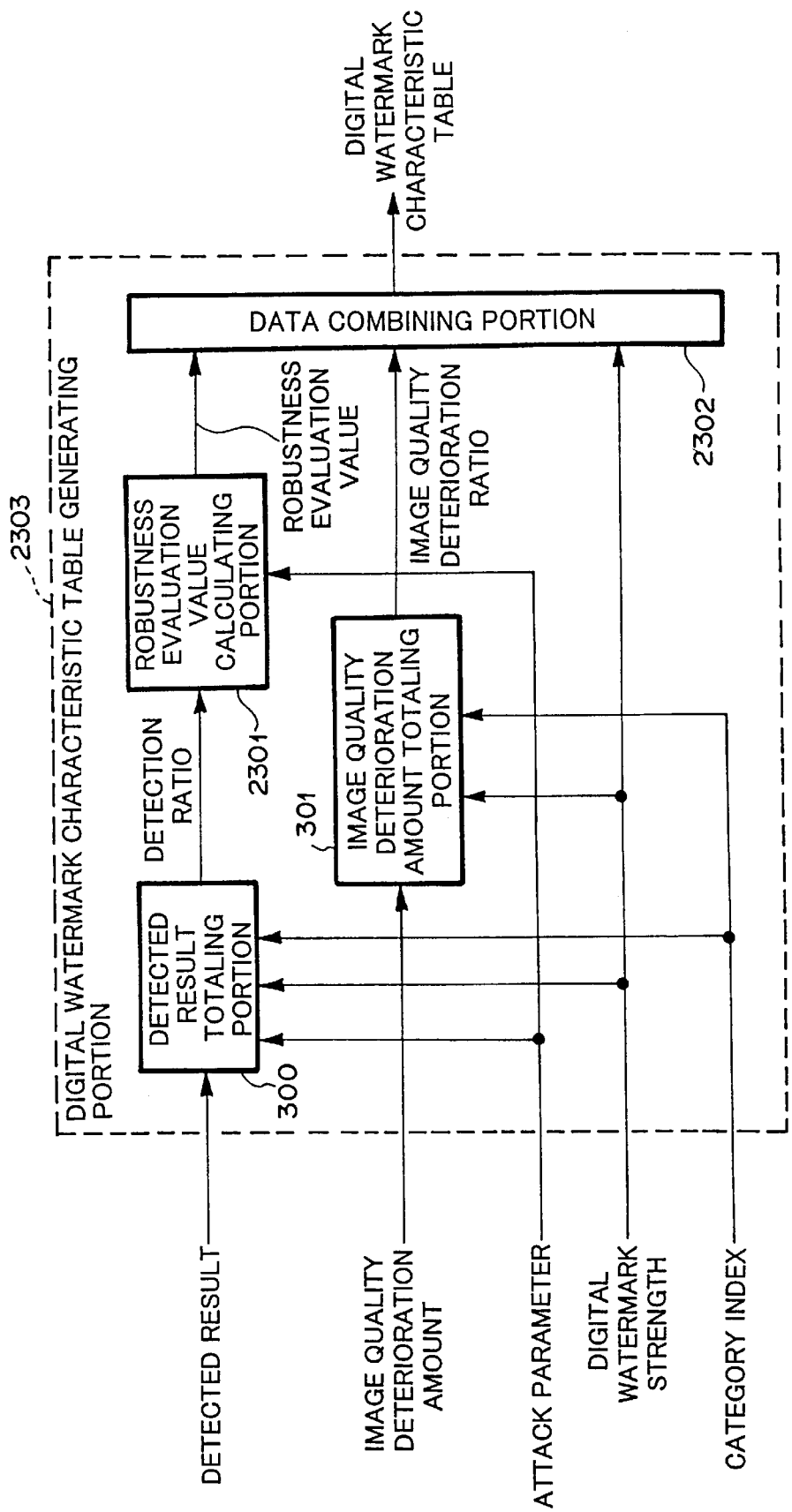
FIG. 3 is a block diagram showing the structure of a digital watermark characteristic table generating portion 2201.

A storing unit 171 outputs an image quality deterioration ratio curve parameter corresponding to the category index that is received from the categorizing portion 103 shown in FIG. 3 to an image quality deterioration ratio calculating portion 172. In addition, the storing unit 171 outputs a detection ratio characteristic general parameter to a robustness evaluation value calculating portion 173.

The image quality deterioration ratio calculating portion 172 obtains an image quality deterioration ratio curve that represents the variation of an image quality deterioration ratio against a digital watermark strength with the image quality deterioration ratio curve parameter that is received from the storing unit 171, calculates an image quality deterioration ratio corresponding to a digital watermark strength that is received from the digital watermark strength calculating portion 100 and outputs the calculated image quality deterioration ratio to the digital watermark strength calculating portion 100.

The robustness evaluation value calculating portion 173 obtains a detection ratio curve/curved surface with the detection ratio characteristic general parameter that is received from the storing unit 171 and the digital watermark strength that is received from the digital watermark strength calculating portion 100 shown in FIG. 4. In addition, the robustness evaluation value calculating portion 173 calculates a robustness evaluation value based on a robustness evaluation value calculation parameter that is input by the user, and outputs the calculated robustness evaluation value to the digital watermark strength calculating portion 100 shown in FIG. 4.

Next, the operation of the digital watermark characteristic calculating portion shown in FIG. 6 will be described.

First of all, the operation of the digital watermark characteristic calculating portion in the case of a single attack will be described. In this case, the detection ratio characteristic general parameter is a detection ratio curve general parameter. A category index that is output from the categorizing portion 103 shown in FIG. 4 is input to the storing unit 171. The storing unit 171 stores a digital watermark characteristic parameter table that describes the relation between a category index, an image quality deterioration ratio curve parameter, and a detection ratio curve general parameter as shown in Table 4.

TABLE 4

| Category index | Image quality deterioration ratio curve parameter | Detection ratio curve general parameter |
|---|---|---|
| 1 | b1(1), b2(1), . . . | p1(1), p2(1), . . . |
| 2 | b1(2), b2(2), . . . | p1(2), p2(2), . . . |
| . . . | . . . | . . . |
| K | b1(K), b2(K), . . . | p1(K), p2(K), . . . | where k is a category index; b1(k), b2(k), . . . are image quality deterioration ratio curve parameters; and p1(k), p2(k), . . . are detection ratio curve general parameters.

Figure 11A:
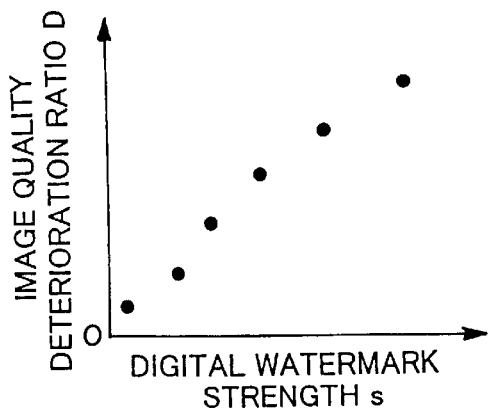
FIGS. 11A to 11D are graphs showing examples of an approximating method for an image quality deterioration ratio and a detection ratio curve parameter according to the present invention.
Figure 11B:
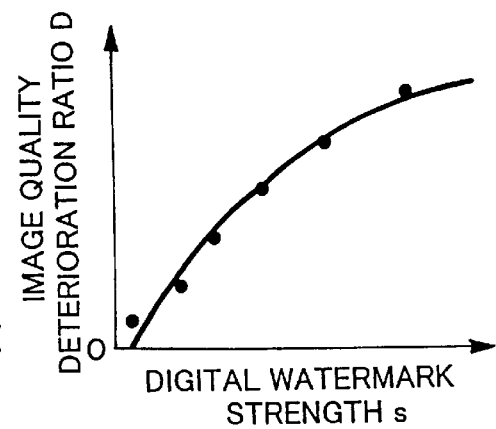

The image quality deterioration ratio is approximated by for example a graph of broken lines or a polynomial. When an image quality deterioration ratio $D(s)$ varies against a digital watermark strength s as shown in FIG. 11A, the image quality deterioration ratio $D(s)$ is approximated as shown in FIG. 11B. For example, the image quality deterioration ratio $D(s)$ is approximated with a quadratic function expressed by the following formula, b1, b2, and b3 are image quality deterioration ratio curve parameters:

$$D(s)=b_1+b_2 s+b_3 s^2 \tag{29}$$

Figure 11C:
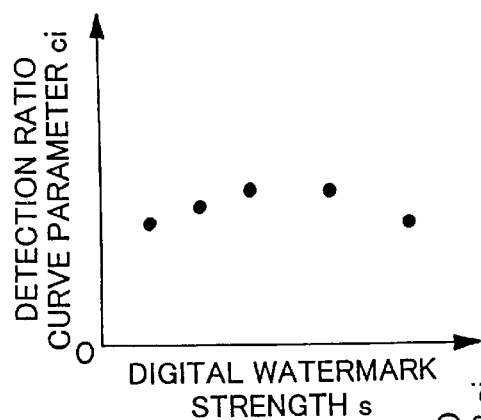
Figure 11D:
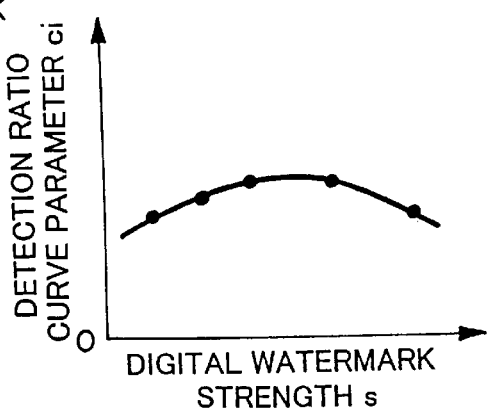

A detection ratio curve parameter is approximated with for example a graph of broken lines or a polynomial. For example, when a detection ratio curve parameter ci varies against a digital watermark strength as shown in FIG. 11C, the detection ratio curve parameter is approximated as shown in FIG. 11D. For example, when the detection ratio curve parameter is approximated with a quadratic function given by the following formula, p1, p2, and p3 are detection ratio curve general parameters:

$$c_i(k,s)=p_1+p_2 s+p_3 s^2 \tag{30}$$

The storing unit 171 stores a digital watermark characteristic table shown in Table 4. When a category index is input to the storing unit 171 from the categorizing portion 103, the storing unit 171 outputs image quality deterioration ratio curve parameters b1(k), b2(k), . . . corresponding thereto to the image quality deterioration ratio calculating portion 172. In addition, the storing unit 171 outputs detection ratio curve general parameters p1(k), p2(k), . . . to the robustness evaluation value calculating portion 173.

When the image quality deterioration ratio curve parameters are input to the image quality deterioration ratio calculating portion 172 from the storing unit 171, the image quality deterioration ratio calculating portion 172 obtains an image quality deterioration ratio curve. The image quality deterioration calculating portion 172 calculates an image quality deterioration ratio corresponding to a digital watermark strength that is received from the digital watermark strength calculating portion 100 shown in FIG. 4 with the obtained image quality deterioration curve and outputs the calculated image quality deterioration ratio to the digital watermark strength calculating portion 100 shown in FIG. 4.

When the detection ratio curve general parameters are input to the robustness evaluation value calculating portion 173 from the storing unit 171, the robustness evaluation value calculating portion 173 obtains a curve that represents the variation of a detection ratio curve parameter against a digital watermark strength. Thereafter, the robustness evaluation value calculating portion 173 obtains a detection ratio curve parameter corresponding to the digital watermark strength that received from the digital watermark strength calculating portion 100 shown in FIG. 4.

Next, the robustness evaluation value calculating portion 173 obtains a detection ratio curve with the obtained detection ratio curve parameter. With the formula (4) or (5), the robustness evaluation value calculating portion 173 calculate a robustness evaluation value V(k, m). The calculating method used by the robustness evaluation value calculating portion 173 is the same as that used by the robustness evaluation value calculating portion 105 shown in FIG. 5 in the case for a single attack. The robustness evaluation value calculating portion 173 outputs the obtained robustness evaluation value to the digital watermark strength calculating portion 100 shown in FIG. 4.

Next, the operation of the digital watermark characteristic calculating portion shown in FIG. 6 in the case of a complex attack will be described. In this case, the detection ratio characteristic general parameters are composed of detection ratio curve general parameters for each single attack composing a complex attack and attack correlation curved surface general parameters.

The category index that is output from the categorizing portion 103 shown in FIG. 4 is input to the storing unit 171. In addition to the table that describes the relation between a category index, an image quality deterioration ratio curve parameter, and a detection ratio curve general parameter shown in Table 4, the storing unit 171 stores a digital watermark characteristic parameter table shown in FIG. 5. The digital watermark characteristic parameter table describes the relation between a category index and an attack correlation curved surface general parameter.

TABLE 5

| Category index | Attack correlation curved surface general parameter |
|---|---|
| 1 | t1(1), t2(1), ... |
| 2 | t1(2), t2(2), ... |
| ... | ... |
| K | t1(K), t2(K), ... | where k is a category index; and t1(k), t2(k), ... are attack correlation curved surface general parameters.

As with a detection ratio curve parameter, an attack correlation curve parameter qi is approximated with for example a graph of broken lines or a polynomial. For example, the attack correlation curve parameter q1 is approximated with a quadratic function expressed by the following formula:

$$q_i(k,s) = t_1 + t_2 s + t_3 s^2 \quad (31)$$

where t1, t2, and t3 are attack correlation curved surface general parameters.

The storing unit 171 stores the digital watermark characteristic tables shown in Table 4 and Table 5. When a category index k is input to the storing unit 171 from the categorizing portion 103, the storing unit 171 outputs image quality deterioration ratio curve parameters b1(k), b2(k), ... corresponding to the category index k to the image quality deterioration ratio calculating portion 172. On the other hand, the storing unit 171 outputs detection ratio curve general parameters p1(k), p2(k), ... for single attacks and attack correlation curved surface general parameters t1(k), t2(k), ... to the robustness evaluation value calculating portion 173.

When the image quality deterioration ratio curve parameters are input to the image quality deterioration ratio calculating portion 172 from the storing unit 171, the image quality deterioration ratio calculating portion 172 obtains an image quality deterioration ratio curve. The image quality deterioration ratio calculating portion 172 calculates an image quality deterioration ratio corresponding to the digital watermark strength that is received from the digital watermark strength calculating portion 100 shown in FIG. 4 with the obtained image quality deterioration ratio curve and outputs the calculated image quality deterioration ratio to the digital watermark strength calculating portion 100 shown in FIG. 4.

When the attack correlation curved surface general parameters are input to the robustness evaluation value calculating portion 173 from the storing unit 171, the robustness evaluation value calculating portion 173 obtains a curve that represents the variation of an attack correlation curved surface parameters against a digital watermark strength. Thereafter, the robustness evaluation value calculating portion 173 obtains attack correlation curved surface parameters corresponding to the digital watermark strength that is received from the digital watermark strength calculating portion 100 shown in FIG. 4. Next, the robustness evaluation value calculating portion 173 obtains an attack correlation curved surface with the obtained attack correlation curved surface parameters.

When detection ratio curve general parameters for a single attack are input to the robustness evaluation value calculating portion 173 from the storing unit 171, the robustness evaluation value calculating portion 173 obtains a curve that represents the variation of the detection ratio curve parameters against the digital watermark strength. Next, the robustness evaluation value calculating portion 173 obtains detection ratio curve parameters corresponding to the digital watermark strength that is received from the digital watermark strength calculating portion 100 shown in FIG. 4. Thereafter, with the obtained detection ratio curve parameters, the robustness evaluation value calculating portion 173 obtains a detection ratio curve. With the obtained attack correlation curved surface and detection ratio curve, as with the formula (23), the robustness evaluation value calculating portion 173 obtains a detection ratio curved surface for the complex attack.

Next, with the formulas (24) and (25), the robustness evaluation value calculating portion 173 calculates a robustness evaluation value V(k, m). This calculating method used in the robustness evaluation value calculating portion 173 is the same as that used in the robustness evaluation value calculating portion 105 shown in FIG. 5 in the case of a complex attack. The obtained robustness evaluation value is output to the digital watermark strength calculating portion 100 shown in FIG. 4.

[Second Embodiment]

Next, with reference to FIG. 7, a second embodiment of the present invention will be described.

FIG. 7 is a block diagram showing the structure of a digital watermark inserting system according to the second embodiment of the present invention. In the digital watermark inserting system shown in FIG. 7, a digital watermark characteristic calculating portion 131 is used instead of the digital watermark characteristic calculating portion 104 of the digital watermark inserting system shown in FIG. 4. In addition, a digital watermark characteristic parameter table generating unit 132 is connected to the digital watermark characteristic calculating portion 131. The other portions of the digital watermark inserting system shown in FIG. 7 are the same as those of the digital watermark inserting system shown in FIG. 4.

In the system shown in FIG. 7, the digital watermark characteristic parameter table generating unit 132 generates a digital watermark characteristic parameter table. The digital watermark characteristic parameter table is output to the digital watermark characteristic calculating portion 131 and stored in a storing unit thereof. The operation of the digital watermark characteristic calculating portion 131 is the same as that of the digital watermark characteristic calculating portion 104 shown in FIG. 4. The digital watermark characteristic parameter table generating unit 132 will be described later.

[Third Embodiment]

Next, with reference to FIG. 8, a third embodiment of the present invention will be described.

FIG. 8 is a block diagram showing the structure of a digital watermark inserting system according to a third embodiment of the present invention. In the digital watermark inserting system shown in FIG. 8, a digital watermark characteristic calculating portion 151 is used instead of the digital watermark characteristic calculating portion 104 of the digital watermark inserting system shown in FIG. 4. In addition, an input unit 152 is connected to the digital watermark characteristic calculating portion 151. A record medium unit 153 is connected to the input unit 152. The other portions of the digital watermark inserting system shown in FIG. 8 are the same as those of the digital watermark inserting system shown in FIG. 4.

In the system shown in FIG. 8, a unit equivalent to the digital watermark characteristic parameter table generating unit 132 shown in FIG. 7 generates a digital watermark characteristic parameter table. The generated digital watermark characteristic parameter table is stored in the record medium unit 153. The digital watermark characteristic parameter table stored in the record medium unit 153 is input to the digital watermark characteristic calculating portion 151 through the input unit 152 and stored to a storing unit of the digital watermark characteristic calculating portion 151. The operation of the digital watermark characteristic calculating portion 151 is the same as the operation of the digital watermark characteristic calculating portion 104 shown in FIG. 4.

[Fourth Embodiment]

Next, with reference to FIG. 12, a digital watermark characteristic parameter table generating unit according to a fourth embodiment of the present invention will be described.

Figure 2:
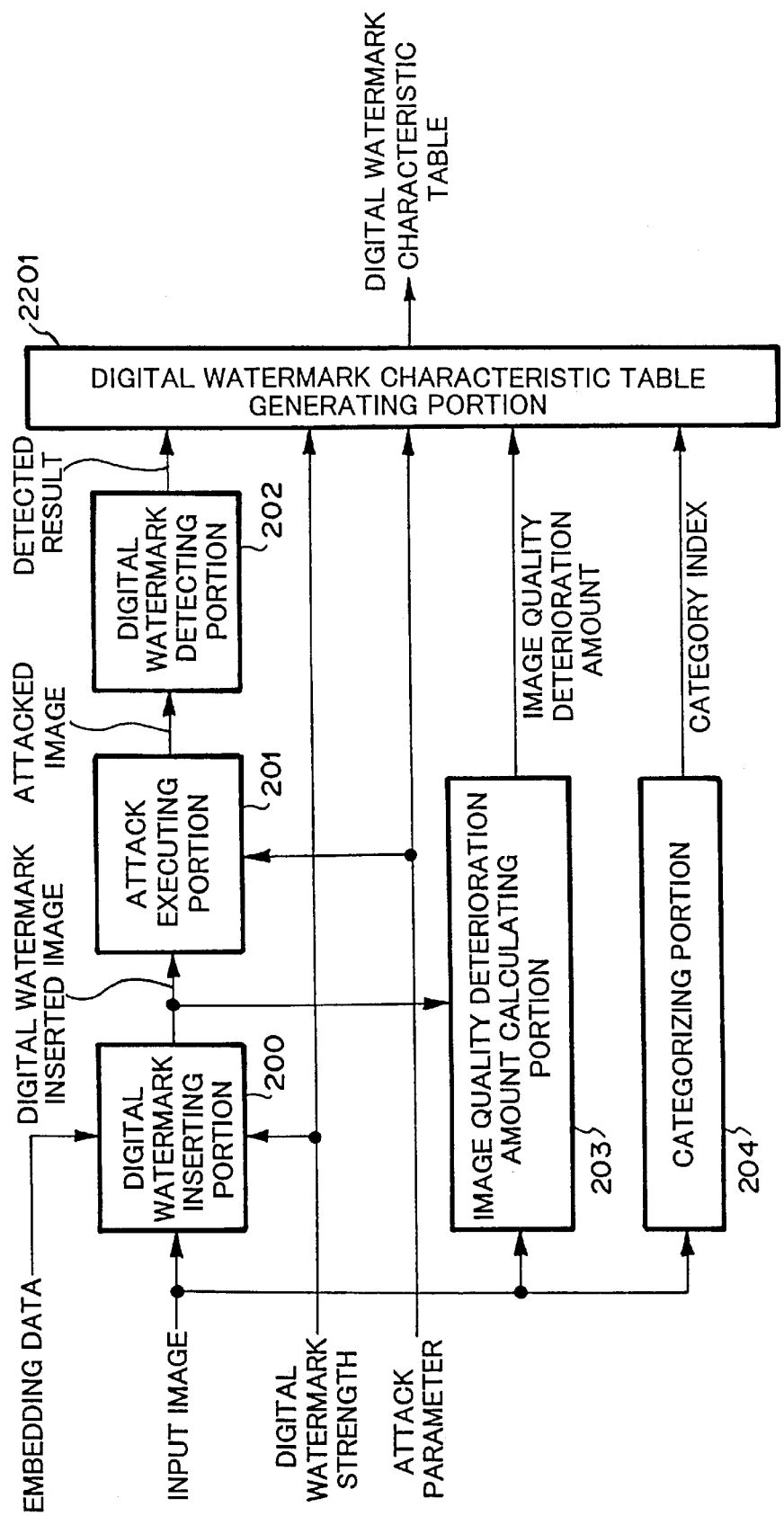
FIG. 2 is a block diagram showing the structure of a conventional digital watermark characteristic table generating unit.

FIG. 12 is a block diagram showing the structure of the digital watermark characteristic parameter table generating unit according to the fourth embodiment of the present invention. The structure of the digital watermark characteristic parameter table generating unit according to the fourth embodiment is the same as that of the conventional digital watermark characteristic table generating unit shown in FIG. 2 except that a digital watermark characteristic parameter table calculating portion 205 is used instead of the digital watermark characteristic table generating portion 2201. The digital watermark characteristic parameter table calculating portion 205 obtains information that describes an image quality deterioration ratio and a detection ratio with a detected result that is received from the digital watermark detecting portion 202, a digital watermark strength, a attack parameter, an image quality deterioration amount that is received from the image quality deterioration amount calculating portion 203, and a category index that is received from the categorizing portion 204. The digital watermark characteristic parameter table calculating portion 205 outputs a table that describes the relation between these factors, a category index, and a digital watermark strength as a digital watermark characteristic parameter table.

Next, the operation of the digital watermark characteristic parameter table generating unit shown in FIG. 12 will be described. The operation of the digital watermark characteristic parameter table generating unit shown in FIG. 12 is the same as that of the conventional digital watermark characteristic table generating unit shown in FIG. 2 except for a digital watermark characteristic parameter table calculating portion 205. Next, with reference to FIG. 13, the digital watermark characteristic parameter table calculating portion 205 will be described in detail.

Figure 13:
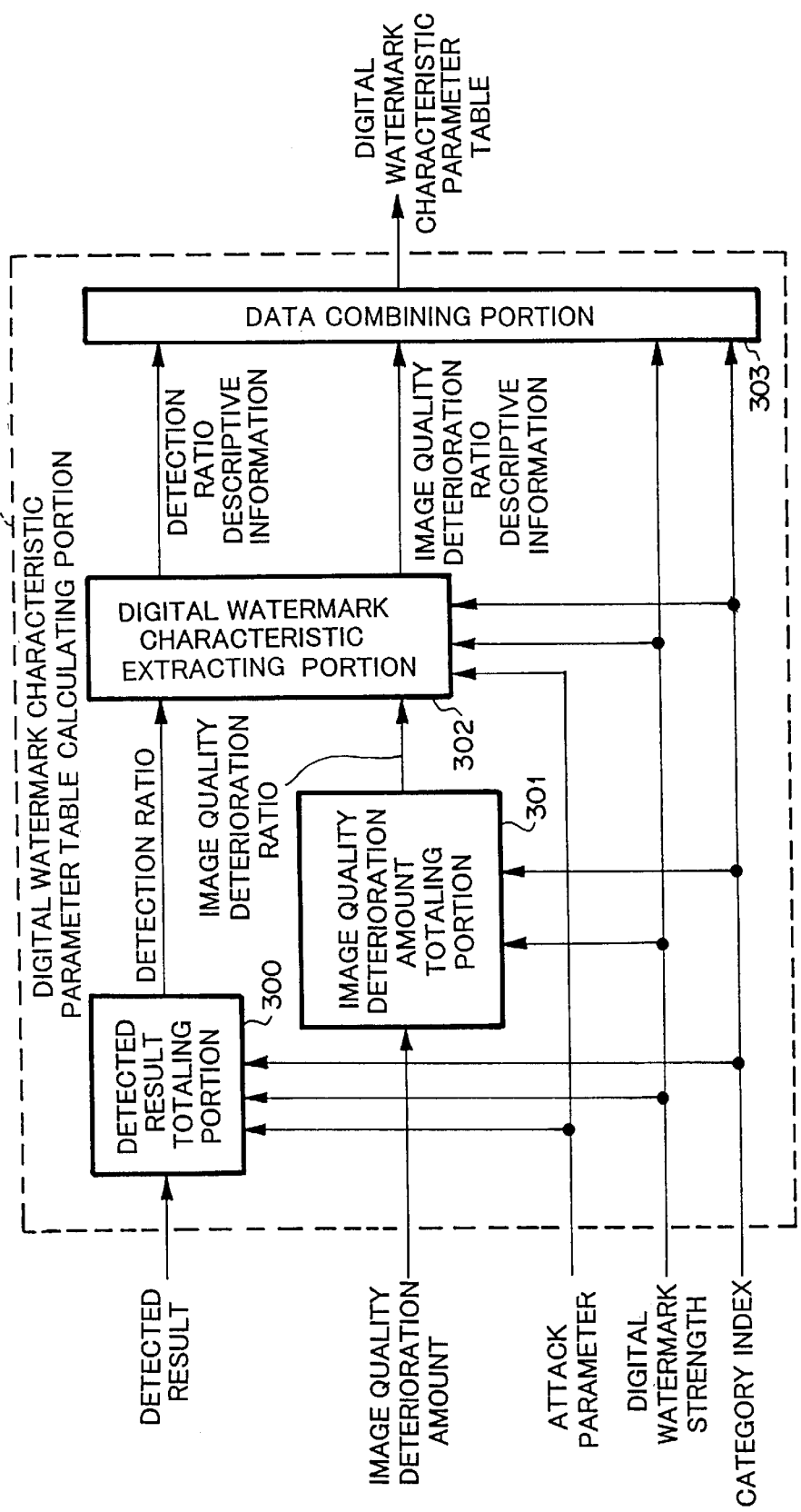
FIG. 13 is a block diagram showing the structure of a digital watermark characteristic parameter table calculating portion 205 shown in FIG. 12 according to the present invention.

FIG. 13 is a block diagram showing the structure of a digital watermark characteristic parameter table calculating portion 205. A detected result totaling portion 300 totals detected results for each attack parameter, each digital watermark strength, and each category index, calculates detection ratios with the totaled results, and outputs the calculated detection ratios to a digital watermark characteristic extracting portion 302. An image quality deterioration amount totaling portion 301 totals image quality deterioration amounts for each category index and each digital watermark strength, calculates image quality deterioration ratios with the totaled results, and outputs the calculated image quality deterioration ratios to a digital watermark characteristic extracting portion 302.

The digital watermark characteristic extracting portion 302 obtains the relation of attack parameters and detection ratios that are received from the detected result totaling portion 300, calculates detection ratio descriptive information that describes a curve that approximates the relation, and outputs the calculated result to a data combining portion 303. In addition, the digital watermark characteristic extracting portion 302 calculates image quality deterioration ratio descriptive information that describes the image quality deterioration amounts that are received from the image quality deterioration amount totaling portion 301 and outputs the calculated result to the data combining portion 303. The data combining portion 303 generates a table that describes the relation between a category index, a digital watermark strength, and the detection ratio descriptive information and the image quality deterioration ratio descriptive information that are received from the digital watermark characteristic extracting portion 302 and outputs the generated table as a digital watermark characteristic parameter table.

Next, the operation of the digital watermark characteristic parameter table calculating portion shown in FIG. 13 will be described. The operations of the detected result totaling portion 300 and the image quality deterioration amount totaling portion 301 of the digital watermark characteristic parameter table calculating portion shown in FIG. 13 are the same as the operations of the detected result totaling portion 300 and the image quality deterioration amount totaling portion 301 of the conventional digital watermark characteristic parameter table calculating portion. When a detection ratio for a complex attack is calculated, detection ratios of attack parameters of individual single attacks composing the complex attack are calculated.

A detection ratio that is output from the detected result totaling portion 300 and an image quality deterioration ratio that is output from the image quality deterioration amount totaling portion 301 are input to the digital watermark characteristic extracting portion 302. The digital watermark characteristic extracting portion 302 obtains image quality deterioration ratio descriptive information and detection ratio descriptive information, and outputs to the data combining portion 303.

The image quality deterioration ratio descriptive information may be an image quality deterioration ratio or an image quality deterioration ratio curve parameter.

On the other hand, the detection ratio descriptive information may be a detection ratio characteristic parameter or a detection ratio characteristic general parameter. In the case of a single attack that is a single process, the detection ratio characteristic parameter is a detection ratio curve parameter. In the case of a complex attack, the detection ratio characteristic parameter is composed of a detection ratio curve parameter and an attack correlation curved surface parameter. In the case of a single attack, the detection ratio characteristic general parameter is a detection ratio curve general parameter. In the case of a complex attack, the detection ratio characteristic general parameter is composed of a detection ratio curve general parameter and an attack correlation curved surface general parameter.

The structure and operation of the digital watermark characteristic extracting portion 302 depend on whether the image quality deterioration ratio descriptive information is an image quality deterioration ratio or an image quality deterioration ratio curve parameter. In addition, the structure and operation of the digital watermark characteristic extracting portion 302 depend on whether the detection ratio descriptive information is a detection ratio characteristic parameter or a detection ratio characteristic general parameter. Moreover, the structure and operation of the digital watermark characteristic extracting portion 302 depend on whether a single attack or a complex attack is applied. These cases will be described later in detail.

The data combining portion 303 generates a digital watermark characteristic parameter table with the image quality deterioration ratio descriptive information and the detection ratio descriptive information that are received from the digital watermark characteristic extracting portion 302 and outputs the generated digital watermark characteristic parameter table. The operation of the data combining portion 303 will be described later along with the operation of the digital watermark characteristic extracting portion 302.

Next, with reference to FIG. 14, the structure and operation of the digital watermark characteristic extracting portion 302 shown in FIG. 13 in the case that the image quality deterioration ratio descriptive information is an image quality deterioration ratio and that the detection ratio descriptive information is a detection ratio characteristic parameter will be described.

Figure 14:
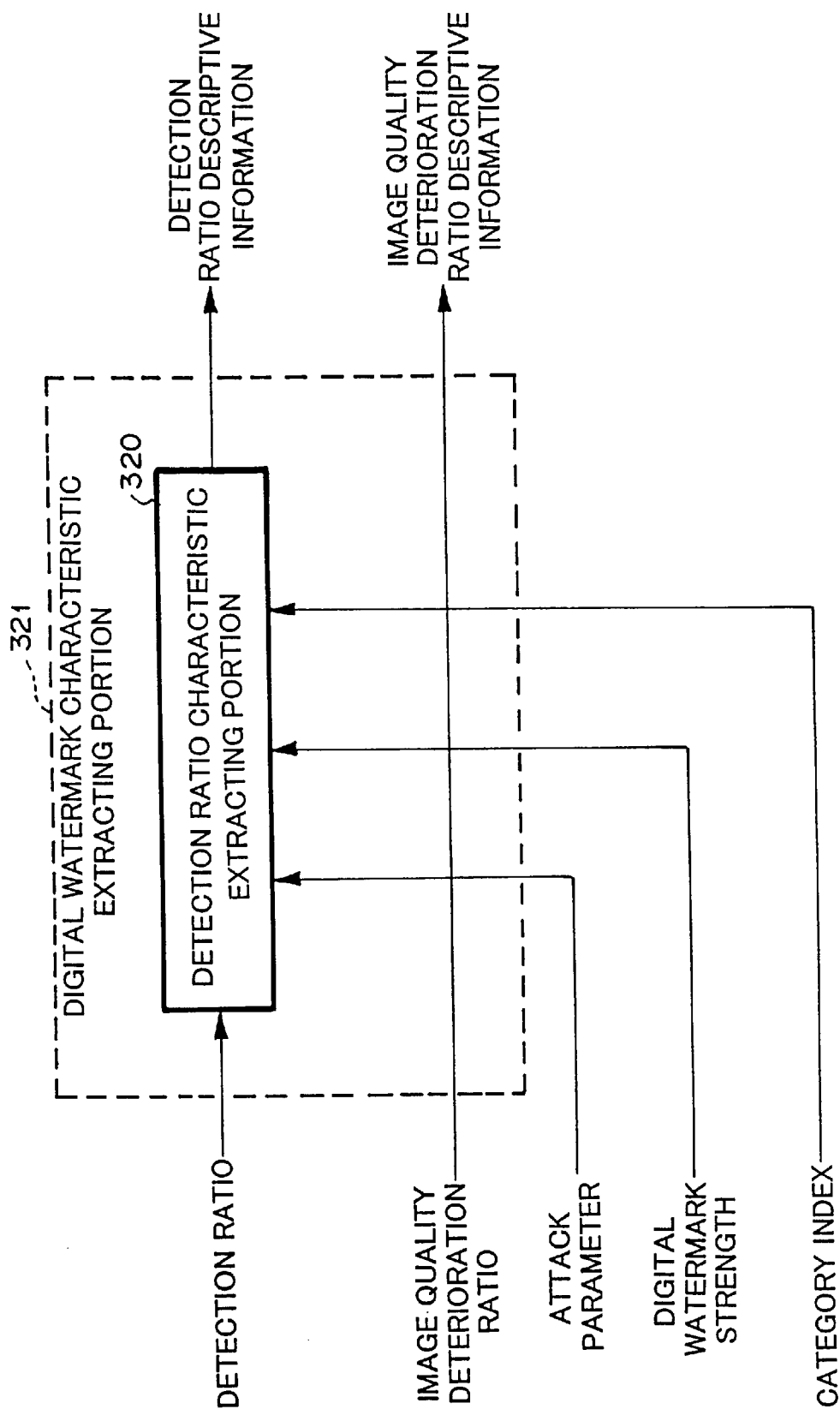
FIG. 14 is a schematic diagram showing a first example of the structure of a digital watermark characteristic extracting portion 302 shown in FIG. 13 according to the present invention.

FIG. 14 is a schematic diagram showing an example of the structure of the digital watermark characteristic extracting portion 302 according to the present invention. The detection ratio characteristic extracting portion 320 obtains the relation of a detection ratio that is received from the detected result totaling portion 300 shown in FIG. 13, an attack parameter, and a digital watermark strength for each category index, calculates detection ratio characteristic parameters with the obtained results, and outputs the calculation results as detection ratio descriptive information. On the other hand, image quality deterioration ratios are input to the digital watermark characteristic extracting portion 302 from the image quality deterioration amount totaling portion 301 and outputs them as image quality deterioration ratio descriptive information.

Next, the operation of the detection ratio characteristic extracting portion 320 shown in FIG. 14 will be described. First of all, the operation of the detection ratio characteristic extracting portion 320 in the case of a single attack will be described. In this case, the detection ratio characteristic parameter is a detection ratio curve parameter.

Next, the method for calculating a detection ratio curve parameter with the relation $(x(1), r(x(1))), (x(2), r(x(2))), \ldots, (x(N), r(x(N)))$ of an attack parameter x at N points and a detection ratio $r(x)$ will be described in the assumption that the relation of $x(1) \leq x(2) \leq \ldots \leq x(N)$ is satisfied.

First of all, the detection ratio characteristic extracting portion 320 checks the variation of the detection ratio against the attack parameter and approximates the variation with a curve defined by several parameters. The type of curve that approximates the variation depends on the digital watermark system and attack for use. The type of curve maybe pre-designated for each attack. Alternatively, the detection ratio characteristic extracting portion 320 may calculate a detection ratio curve parameter for each curve that has been registered and select a curve that has the minimum approximation error.

When a logistic curve expressed by the formula (7) is used, the following relation is satisfied:

$$c_1(x + c_2) = \ln\left[\frac{1}{r(x)} - 1\right] \quad (32)$$

Thus, for the N points, the detection ratio characteristic extracting portion 320 obtains the relation of the amount of the right side of the formula (32) and the attack parameter x and approximates the relation with a line, and obtains detection ratio curve parameters c1 and c2. To approximate the relation with a line, for example, the method of least squares can be used.

For a curve that satisfies the following formula as with a logistic curve:

$$u = \frac{1}{1 + e^v} \quad (33)$$

when v is changed by a small amount $\Delta v$, the amount of change $\Delta u$ of u is expressed by the following formula:

$$\Delta u = -\frac{e^v}{(1 + e^v)^2}\Delta v = -u(1 - u)\Delta v \quad (34)$$

Thus, the influence of the approximation error against the line is proportional to the following formula:

$$r(x)(1-r(x)) \quad (35)$$

Thus, when coefficients are calculated by the method of least squares, approximation errors can be weighted with the value of the formula (35) or a value as a function thereof. In other words, they are weighted according to the following formula:

$$\sum_{x=1}^{N} r(x(n))\{1 - r(x(n))\}\left\{c_1(x(n) + c_2) - \ln\left(\frac{1}{r(x(n))} - 1\right)\right\}^2 \quad (36)$$

Parameters that minimize the coefficients are calculated. Thus, the total approximation error can be suppressed.

When a graph of broken lines expressed by the formula (8) is used, a point that satisfies the following relation of the detection ratio is selected from the N points and the selected point is directly applied, the detection ratio curve parameters c1 and c2 can be obtained:

$$r1 \leq r(x) \leq r_2 \quad (37)$$

where r1 and r2 may be any values as long as they satisfy the following relation:

$$0 \leq r_1 < r_2 \leq 1 \quad (38)$$

For example, r1=0.1 and r2=0.9.

When a graph of broken lines expressed by the formula (9) is used, the N points are separated into n points close to 0 and the remaining (N−n) points. Lines comprising the two portions are obtained. With the point of intersection of these lines and the point of intersection of the line of the (N−n) points and the axis of the attack parameter, the detection ratio curve parameters c1, c2, and c3 can be obtained. In this case, n points can be selected in various manners. For example, an integer that satisfies the relation of $1 \leq n \leq N$ that allows the approximation error to be minimum can be used.

When a fractional function expressed by the formula (10) is used as a curve, the following relation is satisfied:

$$c_1 x + c_2 x^2 = \frac{1}{r(x)} - 1 \quad (39)$$

Thus, for the N points, the relation of the amount of the right side of the formula (39) and the attack parameter x is obtained and applied to a quadratic function. Consequently, the detection ratio curve parameters c1 and c2 can be obtained. To applies the relation to a quadratic function, for example, the method of least squares can be used.

For a curve that satisfies the following formula:

$$u = \frac{1}{v} \quad (40)$$

when v is changed by a small amount $\Delta v$, the amount of change $\Delta u$ of u can be expressed by the following formula:

$$\Delta u = -\frac{1}{v^2}\Delta v = -u^2 \Delta v \quad (41)$$

Thus, the method of least squares can be used along with the weighting method. When an exponential function expressed by the formula (11) is used as a curve, the following relation is satisfied:

$$-c_1(x-c_2) = \ln r(x) \quad (42)$$

Thus, for the N points, the relation of the natural logarithm of the detection ratio and the attack parameter x is obtained and applied to a line. Thus, the detection ratio curve parameters c1 and c2 are obtained. As a method for applying the relation to a line, for example, the method of least squares can be used.

For a curve that is expressed by the following formula:

$$u = e^{-v} \quad (43)$$

when v is changed by a small amount $\Delta v$, the amount of change $\Delta u$ of u is expressed by the following formula:

$$\Delta u = -e^{-v}\Delta v = -u\Delta v \quad (44)$$

The method of least squares maybe used along with the weighting method. In such a manner, detection ratio curve parameters are calculated for each category index and each digital watermark strength. Along with the image quality deterioration ratio descriptive information, the detection ratio curve parameters are output as detection ratio descriptive information to the data combining portion 303. The data combining portion 303 generates and outputs a digital watermark characteristic parameter table as shown in Table 2 for each category index.

Next, the operation of the digital watermark characteristic calculating portion shown in FIG. 14 in the case of a complex attack will be described. In this case, the detection ratio characteristic parameter is composed of a detection ratio curve parameter of each single attack composing the complex attack and an attack correlation curved surface parameter.

In the above-described manner, a detection ratio curve parameter for each single attack composing a complex attack is calculated.

Next, a method for calculating an attack correlation curved surface parameter with a detection ratio r1,2(x1, x2) at N points (x1(1), x2(1)), (x1(2) x2(2)), . . . , (x1(N), x2(N)) will be described.

First of all, for N combinations of (x1, x2), an attack correlation value z1,2(x1, x2) expressed by the formula (16) is calculated with values r1(x1) and r2(x2) obtained from a detection ratio curve for a single attack and a detection ratio r1,2(x1, x2) of a complex attack. The N pieces of data of (x1, x2, z1,2(x1, x2)) are applied to a curved surface. When an attack correlation value is calculated, really measured detection ratios for single attacks can be used instead of values obtained from the detection ratio curve. When a function expressed by the formula (20) is used as a curved surface, the following relation is satisfied:

$$\ln q_1 + q_2 \ln x_1 + q_3 \ln x_2 = \ln\left[\frac{1}{z_{1,2}(x_1, x_2)} - 1\right] \quad (45)$$

Thus, when the relation of the logarithmic values of attack parameters and the amount of the right side of the formula (45) is obtained for the N points and applied to a plane, ln q1, q2, and q3 can be obtained. Thus, the value of q1 can be obtained with ln q1. Consequently, attack correlation curved surface parameters can be calculated. When the relation is applied to a plane, for example, the method of least squares can be used.

In this case, the formula (20) can be expressed by the following formula:

$$z_{1,2}(x_1, x_2) = \frac{1}{1 + \exp(\ln q_1 + q_2 \ln x_1 + q_3 \ln x_2)} \quad (46)$$

In addition, for a curve that satisfies the formula (33), when v is changed by a small amount $\Delta v$, the amount of change $\Delta u$ of u is expressed by the formula (34). Thus, as with the formula (36), the method of least squares can be used along with the weighting method. When single attack detection ratios r1(x1) and r2(x2) are small, the formula (23) shows that the influence of the approximation error of z1,2(x1, x2) against the complex attack detection ratio r1,2(x1, x2) is small. Thus, accurate approximation of z1,2 (x1, x2) is required only in the range of which the single attack detection ratios r1(x1) and r2(x2) are large.

When a function expressed by the formula (21) is used as a curved surface, it is difficult to obtain parameters that analytically minimize the approximation error. However, when a proper algorithm such as the steepest descent method is used, attack correlation parameters can be calculated. In such a manner, attack correlation curve surface parameters for each category index and each digital watermark strength are calculated. In addition to the image quality deterioration ratio descriptive information, the calculated attack correlation curved surface parameters and the single attack detection ratio curve parameters are output as the detection ratio descriptive information to the data combining portion 303. The data combining portion 303 generates and outputs digital watermark characteristic parameter tables shown in Tables 2 and Tables 3 for individual category indexes.

Next, with reference to FIG. 15, the structure and operation of the digital watermark characteristic extracting portion 302 shown in FIG. 13 in the case that the image quality deterioration ratio descriptive information is an image quality deterioration ratio curve parameter and that the detection ratio descriptive information is a detection ratio characteristic general parameter will be described. FIG. 15 is a block diagram showing an example of the structure of the digital watermark characteristic extracting portion 302 according to the present invention.

For each category index, a detection ratio characteristic parameter calculating portion 340 obtains the relation of a detection ratio that is received from the detected result totaling portion 300 shown in FIG. 13, an attack parameter, and a digital watermark strength, calculates detection ratio characteristic general parameters with the obtained relation, and outputs the calculated detection ratio characteristic general parameters as detection ratio descriptive information. An image quality deterioration ratio characteristic extracting portion 341 obtains the relation of an image quality deterioration ratio that is received from the image quality deterioration amount totaling portion 301 shown in FIG. 13 and a digital watermark strength, calculates image quality deterioration ratio curve parameters with the obtained relation, and outputs the calculated image quality deterioration ratio curve parameters as image quality deterioration ratio descriptive information.

Next, the operation of the digital watermark characteristic extracting portion shown in FIG. 15 will be described.

First of all, the operation of the digital watermark characteristic extracting portion in the case of a single attack will be described. In this case, the detection ratio characteristic general parameter is a detection ratio curve general parameter. The image quality deterioration ratio characteristic extraction portion 341 calculates parameters of an image quality detection ratio curve that approximates the variation of an image quality deterioration ratio against a digital watermark strength. For example, the image quality detection ratio characteristic extracting portion 341 approximates the variation with a quadratic function expressed by the formula (29), by fitting a quadratic curve to the variation, image quality detection ratio curve parameters b1, b2, and b3 can be calculated. In this case, for example, the method of least squares can be used. The obtained image quality deterioration ratio curve parameters are output as image quality deterioration ratio descriptive information to the data combining portion 303 shown in FIG. 13.

The detection ratio characteristic extracting portion 340 calculates detection ratio characteristic general parameters. In the same manner as the digital watermark characteristic extracting portion 320 shown in FIG. 14, the detection ratio characteristic extracting portion 340 calculates detection ratio curve parameters for each category index and each digital watermark strength. Thereafter, the detection ratio characteristic extracting portion 340 obtains the variation of detection ratio curve parameters against each digital watermark strength, fits a curve to the variation, and calculates detection ratio curve general parameters.

When the variation of detection ratio curve parameters against each digital watermark strength is approximated with a quadratic function expressed by the formula (30), by fitting a quadratic curve to the variation, detection ratio curve general parameters p1, p2, and p3 can be calculated. In this case, for example, the method of least squares can be used. The obtained detection ratio curve general parameters are output as detection ratio descriptive information to the data combining portion 303 shown in FIG. 13. The data combining portion 303 generates and outputs a digital watermark characteristic parameter table as shown in Table 4.

Next, the operation of the digital watermark characteristic extracting portion shown in FIG. 15 in the case of a complex attack will be described. In this case, the detection ratio characteristic general parameter is composed of a detection ratio curve general parameter for each attack composing a complex attack and a correlation curved surface general parameter.

The operation of the image quality deterioration ratio characteristic extracting portion 341 in the case of a complex attack is the same as that in the case of a single attack. The image quality deterioration ratio characteristic extracting portion 341 outputs image quality deterioration ratio curve parameters as image quality deterioration ratio descriptive information to the data combining portion 303 shown in FIG. 13.

For each attack composing the complex attack, the detection ratio characteristic extracting portion 340 calculates detection ratio curve parameters and detection ratio curve general parameters in the same manner as the digital watermark characteristic extracting portion 342 performs for a single attack. In addition, the detection ratio characteristic extracting portion 340 calculates attack correlation curved surface parameters in the same manner as the digital watermark characteristic extracting portion 320 shown in FIG. 14 for a complex attack. The detection ratio characteristic extracting portion 340 obtains the variation of attack correlation curved surface parameters against each digital watermark strength and calculates parameters of a curve that approximates the variation.

For example, when the variation of attack correlation curved surface parameters against each digital watermark strength is approximated with a quadratic function expressed by the formula (31), by fitting a quadratic curve to the variation, attack correlation curved surface general parameters t1, t2, and t3 can be calculated. The obtained detection ratio curve general parameters and attack correlation curved surface general parameters are output as detection ratio descriptive information to the data combining portion 303 shown in FIG. 13. The data combining portion 303 generates and outputs digital watermark characteristic parameter tables shown in Tables 4 and 5.

The digital watermark inserting system and the digital watermark characteristic parameter table generating unit have been described. Next, a record medium according to the present invention will be described. On the record medium, a program that allows the digital watermark inserting system and the digital watermark characteristic parameter table generating unit to be accomplished has been recorded.

The program for the digital watermark inserting system and the digital watermark characteristic parameter table generating unit is coded in a program language of which a computer reads the program. The record medium is for example a CD-ROM or a floppy disk.

The record medium may be a record means such as a hard disk of a server unit. When the computer program is recorded to the storing means and read through a network, the record medium according to the present invention can be accomplished.

EXAMPLES

First Example

Next, examples of the embodiments of the present invention will be described.

FIG. 16A is an example of a graph showing the variation of a detection ratio against an attack for adding noise. As an attack parameter, the standard deviation of noise was used. The digital watermark strength was varied in the range from 1 to 4 (1, 2, 3, and 4). The approximated results of the variation with a logistic curve expressed by the formula (7), with a graph of broken lines expressed by the formula (8), and with a graph of broken lines expressed by the formula (9) are shown in FIGS. 16B, 16C, and 16D, respectively. The respective digital watermark characteristic parameter tables are shown in Tables 6, 7, and 8.

TABLE 6

| Digital watermark strength | Image quality deterioration ratio | Detection ratio curve parameters (c1, c2) |
|---|---|---|
| 1 | 0.693 | 0.6408, −10.46 |
| 2 | 0.644 | 0.3556, −14.61 |
| 3 | 0.533 | 0.3207, −18.36 |
| 4 | 0.347 | 0.1422, −30.27 |

TABLE 7

| Digital watermark strength | Image quality deterioration ratio | Detection ratio curve parameters (c1, c2) |
|---|---|---|
| 1 | 0.693 | 5.59, 15.38 |
| 2 | 0.644 | 6.36, 23.35 |
| 3 | 0.533 | 9.08, 26.93 |
| 4 | 0.347 | 10.89, 52.91 |

TABLE 8

| Digital watermark strength | Image quality deterioration ratio | Detection ratio curve parameters (c1, c2, c3) |
|---|---|---|
| 1 | 0.693 | 5.98, 0.9601, 15.38 |
| 2 | 0.644 | 6.56, 0.9158, 23.30 |
| 3 | 0.533 | 11.95, 0.9467, 25.37 |
| 4 | 0.347 | 16.78, 0.8779, 50.92 |

Image quality deterioration ratios D in the tables are calculated with SNR values according to the formula (47):

$$D = \begin{cases} 1 & (SNR > 45) \\ (SNR - 30)/15 & (30 \leq SNR \leq 45) \\ 0 & (SNR < 30) \end{cases} \quad (47)$$

FIG. 18A is a graph showing the variation of a detection ratio against the enlargement/shrinkage in the horizontal direction as another attack example. As an attack parameter, the magnification of the enlargement/shrinkage was used. The digital watermark strength was varied in the range from 1 to 4 (1, 2, 3, and 4).

Figure 17A:
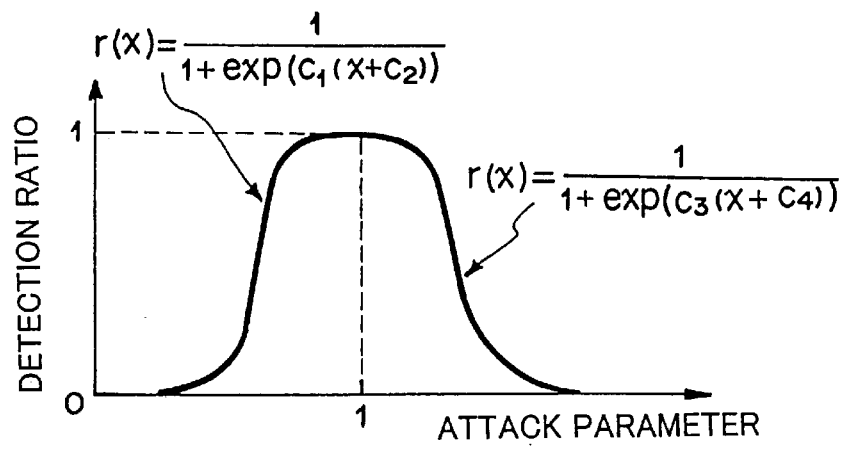
FIGS. 17A to 17C are graphs showing the relation of a detection ratio curve and a parameter according to the present invention.
Figure 17B:
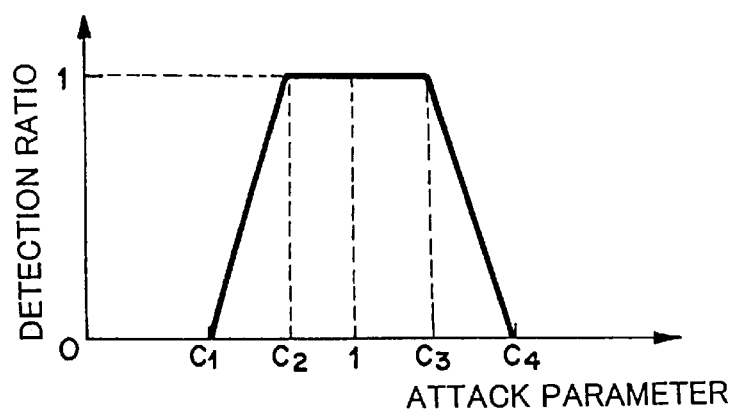
Figure 17C:
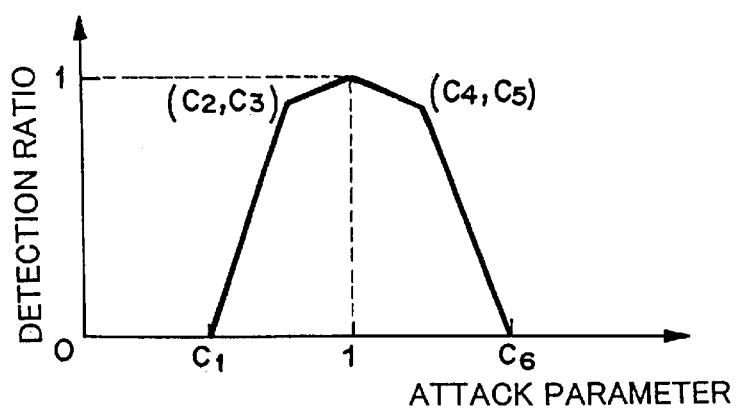

The following curves were fitted to the variation. In this case, when the attack parameter x is 1, it represents that there is no attack. Thus, in two cases x<1 and x>1 respectively, respective curves were fitted to the variation. In this case, each parameter is shown in FIGS. 17A, 17B, and 17C. The approximated results of the variation with a logistic curve expressed by the formula (7), with a graph of broken lines expressed by the formula (8), and with a graph of broken lines expressed by the formula (9) are shown in FIGS. 18B, 18C, and 18D, respectively. The respective digital watermark characteristic parameter tables are shown in Tables 9, 10, and 11, respectively.

TABLE 9

| Digital watermark strength | Image quality deterioration ratio | Detection ratio curve parameters (c1, c2, c3, c4) |
|---|---|---|
| 1 | 0.693 | −142.6, 136.6, 124.3, −130.4 |
| 2 | 0.644 | −124.8, 119.0, 122.9, −129.6 |

TABLE 9-continued

| Digital watermark strength | Image quality deterioration ratio | Detection ratio curve parameters (c1, c2, c3, c4) |
|---|---|---|
| 3 | 0.533 | −171.8, 163.6, 129.7, −137.6 |
| 4 | 0.347 | −131.6, 124.9, 106.0, −112.9 |

TABLE 10

| Digital watermark strength | Image quality deterioration ratio | Detection ratio curve parameters (c1, c2, c3, c4) |
|---|---|---|
| 1 | 0.693 | 0.942, 0.974, 1.031, 1.071 |
| 2 | 0.644 | 0.933, 0.974, 1.034, 1.075 |
| 3 | 0.533 | 0.933, 0.966, 1.042, 1.082 |
| 4 | 0.347 | 0.928, 0.969, 1.043, 1.093 |

TABLE 11

| Digital watermark strength | Image quality deterioration ratio | Detection ratio curve parameters (c1, c2, c3, c4, c5, c6) |
|---|---|---|
| 1 | 0.693 | 0.941, 0.974, 0.989, 1.034, 0.918, 1.072 |
| 2 | 0.644 | 0.933, 0.973, 0.988, 1.036, 0.956, 1.075 |
| 3 | 0.533 | 0.937, 0.963, 0.955, 1.044, 0.943, 1.082 |
| 4 | 0.347 | 0.928, 0.967, 0.948, 1.046, 0.935, 1.093 |

Thus, in such a manner, detection ratio curve parameters can be calculated.

FIG. 19A shows an example of which the variation of an image quality deterioration ratio expressed by the formula (47) against a digital watermark strength was checked and an image quality deterioration ratio curve was obtained. In FIG. 19A, the image quality deterioration ratio was approximated with a quadratic function. FIG. 19B shows an example of which an image quality deterioration curve was obtained in another digital watermark system. In FIG. 19B, the digital watermark strength was approximated with a graph of broken lines. In such a manner, by fitting a curve to the variation, image quality deterioration ratio curve parameters can be calculated. Next, an example of which the variation of a detection ratio curve parameter against a digital watermark strength was checked and approximated with a quadratic curve is described.

Figure 20A:
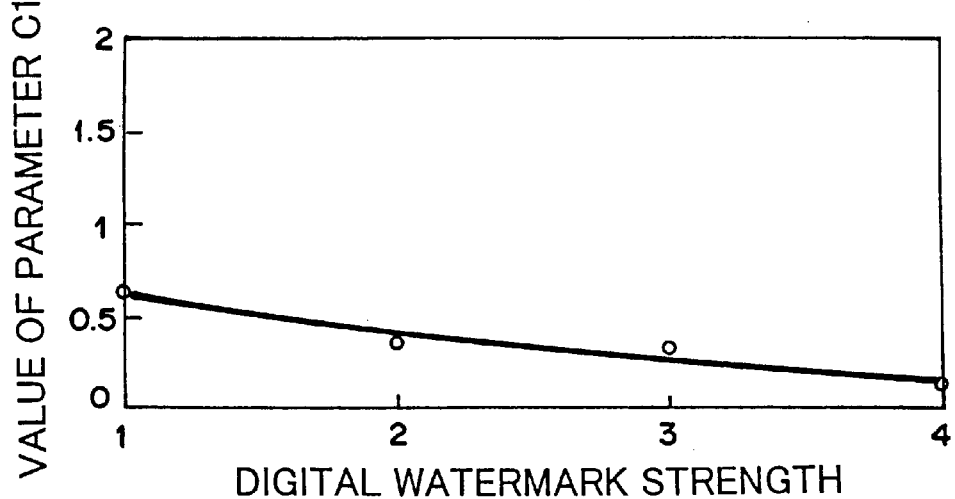
FIGS. 20A and 20B are graphs showing real examples of an approximation curve of a detection ratio curve parameter calculated against a detection ratio curve parameter of the graph shown in FIG. 16B.
Figure 20B:
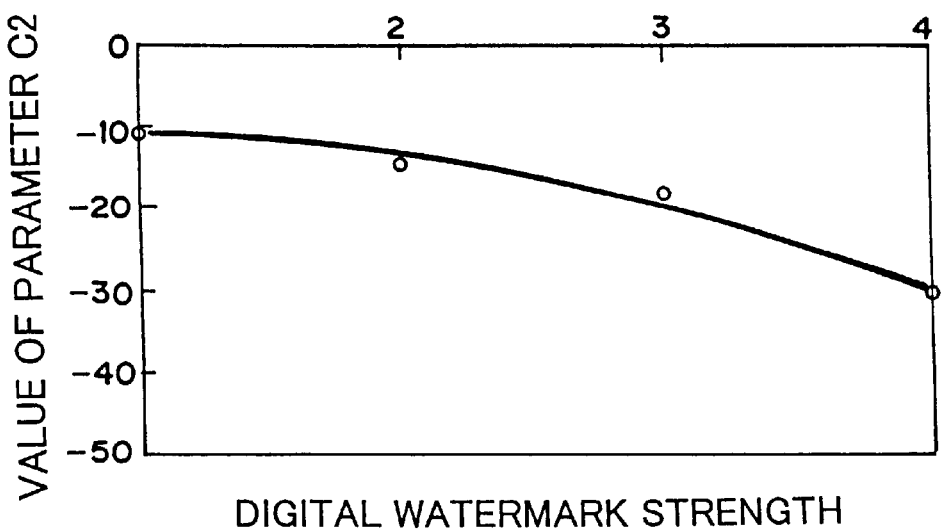
Figure 21A:
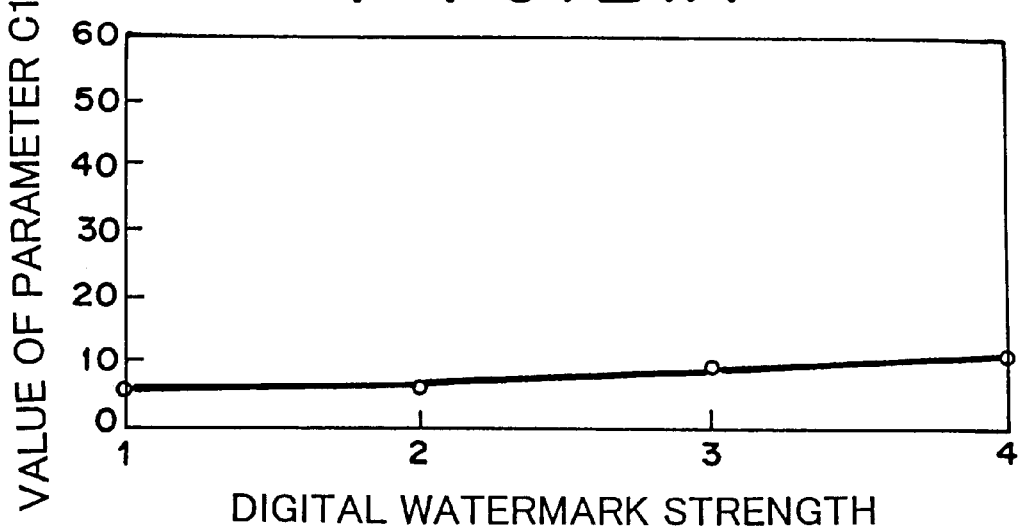
FIGS. 21A and 21B are graphs showing real examples of an approximation curve of a detection ratio curve parameter calculated against a detection ratio curve parameter of the graphs shown in FIG. 16C.
Figure 21B:
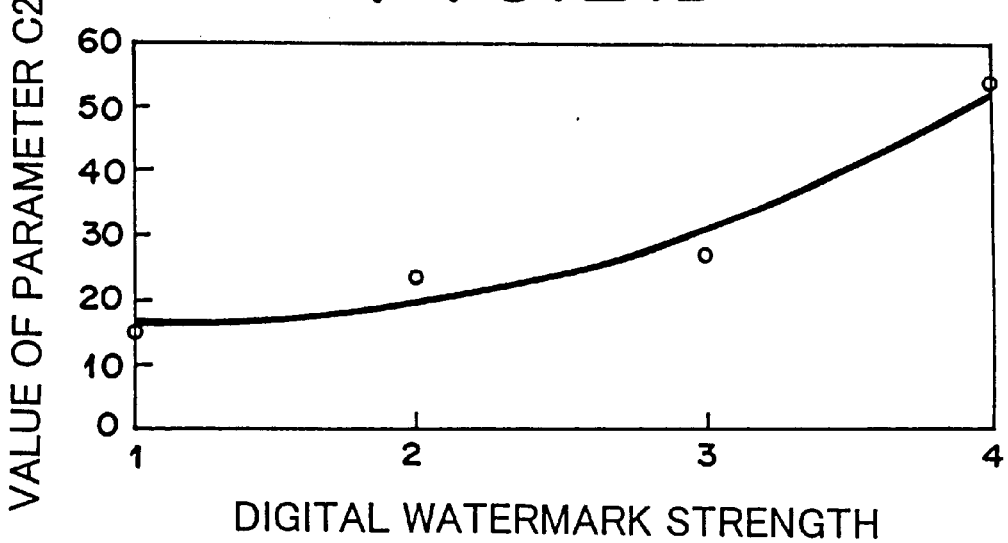
Figure 22A:
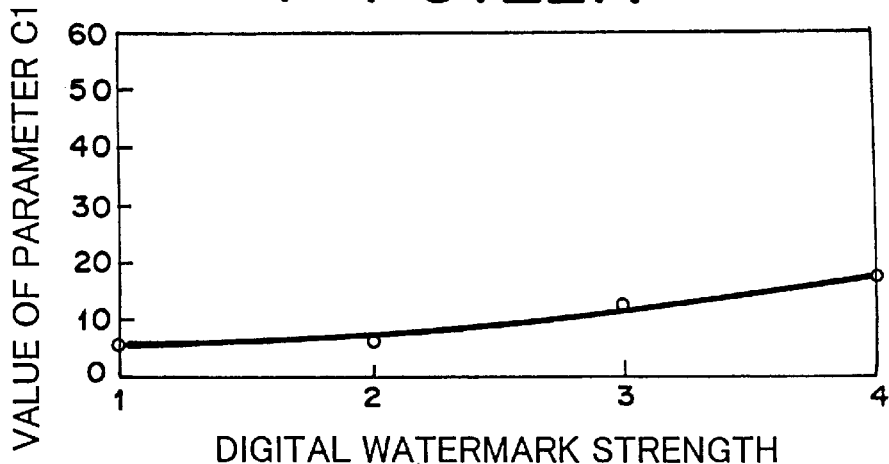
FIGS. 22A to 22C are graphs showing real examples of an approximation curve of a detection ratio curve parameter calculated against a detection ratio curve parameter of the graph shown in FIG. 16D.
Figure 22B:
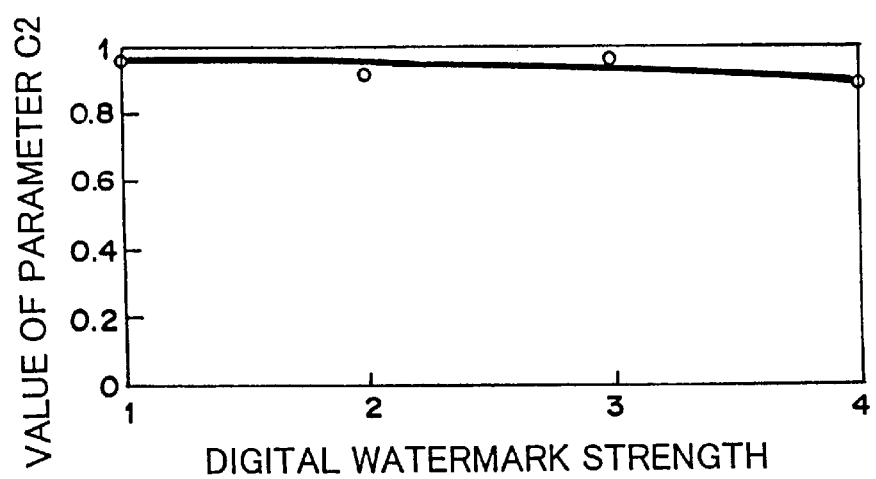
Figure 22C:
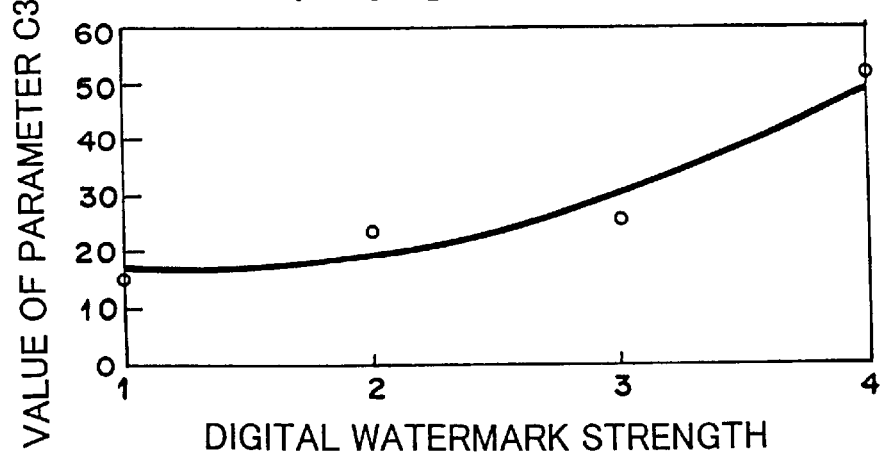

FIGS. 20A and 20B are examples of which quadratic functions are fitted to detection ratio curve parameters c1 and c2 shown in Table 6, respectively. FIGS. 21A and 21B are examples of which quadratic functions are fitted to detection ratio curve parameters c1 and c2 shown in Table 7, respectively. FIGS. 22A, 22B, and 22C are examples of which quadratic functions are fitted to detection ratio curve parameters c1, c2, and c3 shown in Table 8, respectively. In such a manner, by fitting a curve to the variation, detection ratio curve general parameters can be obtained.

Figure 23:
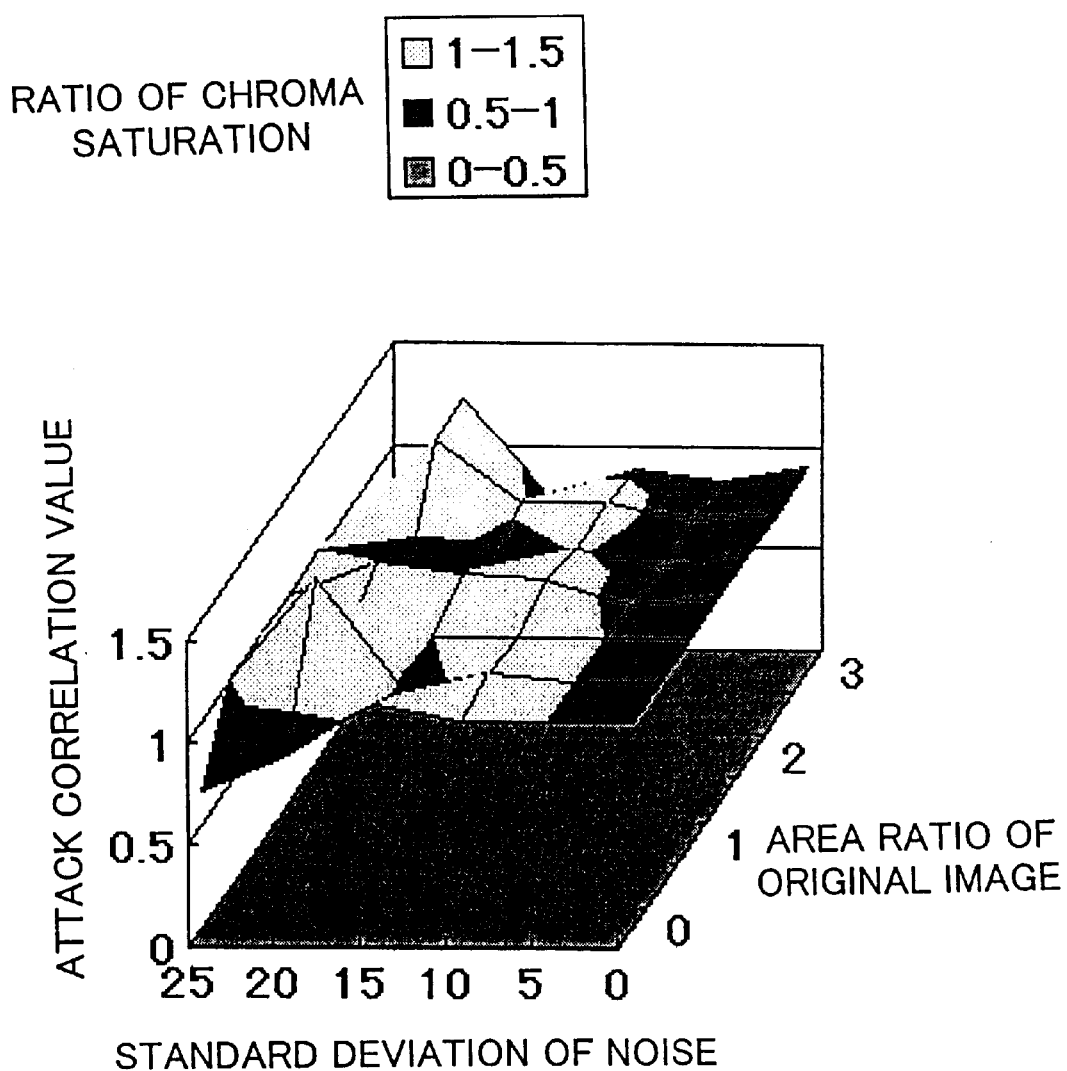
FIG. 23 is a graph showing a real example of an attack correlation value calculated according to the present invention.

Next, an example of which an attack correlation curved surface is calculated for a complex attack is described. FIG. 23 shows a calculated result of an attack correlation value against a complex attack that is a combination of a chromatic saturation varying attack and a noise adding attack according to the formula (16). For the variation of chromatic saturation, the ratio of varied chromatic saturation against original chromatic saturation is used as an attack parameter. FIG. 23 shows that the complex attack does not have a synergism effect of a combination of single attacks.

When a weighting function separable for each variable is used, a robustness evaluation value against a complex attack of the variation of chromatic saturation and noise can be expressed by a produce of a robustness evaluation value against the variation of chromatic saturation and a robustness evaluation value against noise. Thus, the calculation amount can be reduced. When the robustness evaluation value is approximated with the following formula (48), in the region of which the standard deviation of noise is large, the accuracy of approximation is low. In the region, since the detection ratio against noise is small, the influence of an error against a calculated robustness evaluation value is small.

$$Z_{1,2}(X_1,X_2)=1 \tag{48}$$

Next, an example of which an attack correlation curved surface against another complex attack will be described. FIG. 24A shows a calculated result of an attack correlation value for a complex attack of a combination of an image cropping attack and a noise adding attack according to Formula (16). For the image slicing attack, the area ratio of the cropped image against the original image is used as an attack parameter.

On the other hand, for the noise adding attack, standard deviation is used as an attack parameter. FIG. 24B shows an example of an attack correlation curved surface approximated with a curved surface expressed by the formula (20). However, for the image cropping attack, when the attack parameter value x is 1, it represents that there is no attack. Thus, the curve expressed by the formula (20) was horizontally moved and inverted. In such a manner, a curve surface can be fitted to the variation and an attack correlation curved surface parameter can be obtained.

For a complex attack of a combination of an image cropping attack and a noise adding attack, by varying the digital watermark strength, an attack correlation curved surface parameter is calculated. The variation is approximated with a quadratic function. The results are shown in FIGS. 25A, 25B, and 25C. Thus, in such a manner, by fitting a curve to the variation, attack correlation curved surface general parameters can be calculated.

According to the present invention, since data for obtaining a detection ratio is stored rather than a robustness evaluation value, the user can customize a method for calculating a digital watermark robustness evaluation value before inserting a digital watermark into an image.

In addition, since detection ratio characteristic and image quality deterioration characteristic are stored as parameters that approximate detection ratio data and image quality deterioration data, the data amount to be stored can be remarkably reduced in comparison with the case that detection ratio data is stored. Thus, the memory amount can be reduced.

Moreover, since detection ratio data for each single attack that composes a complex attack and data that has a synergism effect of attacks are separately stored, robustness evaluation values for single attacks and a complex attack can be effectively calculated. In addition, for complicated and plurality of types of digital watermark information, robustness evaluation value, image quality deterioration ratio, and digital watermark strength can be analyzed. Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital watermark characteristic parameter table generating method for inserting digital watermark information into an input image, comprising the steps of:

calculating a feature amount of the input image, categorizing the input image based on the calculated result, and outputting a category index as the categorized result;

converting input embedding information into the digital watermark information, inserting the digital watermark information into the input image with input digital watermark strength, and generating a digital watermark inserted image as the inserted data;

adjusting the strength of an attack with an input attack parameter, attacking the digital watermark inserted image with the adjusted attack strength, generating a resultant attacked image, detecting a digital watermark from the attacked image, outputting the detected result;

comparing the input image with the digital watermark inserted image, calculating an image quality deterioration amount caused by the inserted digital watermark, and outputting the calculated image quality deterioration amount; and receiving the detected result of the digital watermark, the digital watermark strength, the attack parameter, the image quality deterioration amount, and the category index, totaling the detected results for each of combinations of the category index, the digital watermark strength, and the attack parameter, obtaining a detection ratio as the totaled result, totaling the image quality deterioration amount for each of combinations of the category index and the digital watermark strength, obtaining an image quality deterioration ratio as the totaled result, and calculating a digital watermark characteristic parameter table by using the detection ratio and the image quality deterioration ratio, and outputting the digital watermark characteristic parameter table.

2. A record medium from which a computer reads a program of a digital watermark characteristic parameter table generating method used for inserting digital watermark information into an input image, the program causing the computer to perform the method, the method comprising the steps of:

calculating a feature amount of the input image, categorizing the input image with the calculated result, and outputting a category index as the categorized result;

converting input embedding information into the digital watermark information, inserting the digital watermark information into the input image with input digital watermark strength, and generating a digital watermark inserted image as the inserted data;

adjusting the strength of an attack with an input attack parameter, attacking the digital watermark inserted image with the adjusted attack strength, generating a resultant attacked image, detecting a digital watermark from the attacked image, outputting the detected result;

comparing the input image with the digital watermark inserted image, calculating an image quality deterioration amount caused by the inserted digital watermark, and outputting the calculated the image quality deterioration amount; and receiving the detected result of the digital watermark, the digital watermark strength, the attack parameter, the image quality deterioration amount, and the category index, totaling the detected results for each of combinations of the category index, the digital watermark strength, and the attack parameter, obtaining a detection ratio as the totaled result, totaling the image quality deterioration amount for each of combinations of the category index and the digital watermark strength, obtaining an image quality deterioration ratio as the totaled result, and calculating a digital watermark characteristic parameter table by using the detection ratio and the image quality deterioration ratio, and outputting the digital watermark characteristic parameter table.

* * * * *